US012592862B2

(12) United States Patent
Terrill et al.

(10) Patent No.: US 12,592,862 B2
(45) Date of Patent: Mar. 31, 2026

(54) MACHINE LEARNING (ML) MODEL MANAGEMENT IN 5G CORE NETWORK

(71) Applicant: Telefonaktiebolaget LM Ericsson (publ), Stockholm (SE)

(72) Inventors: Stephen Terrill, Madrid (ES); Miguel Angel Monjas Llorente, Madrid (ES); Miguel Angel Garcia Martin, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/710,269

(22) PCT Filed: May 18, 2022

(86) PCT No.: PCT/IB2022/054612
§ 371 (c)(1),
(2) Date: May 15, 2024

(87) PCT Pub. No.: WO2023/099970
PCT Pub. Date: Jun. 8, 2023

(65) Prior Publication Data
US 2025/0007791 A1 Jan. 2, 2025

(30) Foreign Application Priority Data
Dec. 3, 2021 (EP) ..................................... 21383092

(51) Int. Cl.
H04L 41/16 (2022.01)
H04L 41/14 (2022.01)
H04W 24/02 (2009.01)
(52) U.S. Cl.
CPC .............. H04L 41/16 (2013.01); H04L 41/14 (2013.01); H04W 24/02 (2013.01)

(58) Field of Classification Search
CPC ........ H04L 41/16; H04L 41/14; H04W 24/02; H04W 24/04
(Continued)

(56) References Cited

U.S. PATENT DOCUMENTS

2023/0224752 A1* 7/2023 Huang ................... H04W 24/10
370/252

FOREIGN PATENT DOCUMENTS

EP 4087192 A1 * 11/2022 ........... H04L 41/149
WO WO-2021047332 A1 * 3/2021 ............. H04L 41/16
(Continued)

OTHER PUBLICATIONS

"3GPP TS 23.288 V17.2.0", 3rd Generation Partnership Project; Technical Specification Group Services and System Aspects; Architecture enhancements for 5G System (5GS) to support network data analytics services (Release 17), Sep. 2021, pp. 1-196.
(Continued)

*Primary Examiner* — Karen C Tang
(74) *Attorney, Agent, or Firm* — Murphy, Bilak & Homiller, PLLC

(57) ABSTRACT

Embodiments include methods for a first network node or function (NNF) configured for machine learning (ML) model management in a communication network. Such methods include receiving, from a second NNF of the communication network, a first message including: one or more ML model identifiers corresponding to one or more ML models maintained by the first node, or an identifier of an analytic based on the ML model(s). Such methods include sending, to the second NNF, a second message including one of the following: a plurality of tuples corresponding to a plurality of ML models on which the analytic is based, each tuple including a different ML model identifier and information element(s) associated with the corresponding ML (Continued)

5GC 198

NG 102    NG 152

NG-RAN
199 gNB  gNB-CU 100
110

Xn gNB  gNB-CU 150

122    132    140
F1     F1

F1     F1

120    130
gNB-DU  gNB-DU gNB-DU  gNB-DU model; or a single tuple including the analytic identifier and information element(s) associated with a single ML model on which the analytic is based. Other embodiments include complementary methods for the second NNF.

25 Claims, 11 Drawing Sheets

(58) Field of Classification Search
USPC ......................................................... 709/224
See application file for complete search history.

(56) References Cited

FOREIGN PATENT DOCUMENTS

| WO | WO-2021136601 A1 * | 7/2021 | ............. H04L 41/16 |
|----|----|----|----|
| WO | WO-2021187948 A1 * | 9/2021 | ............. H04L 41/40 |
| WO | WO-2023036436 A1 * | 3/2023 | ............. H04W 24/02 |
| WO | WO-2023061570 A1 * | 4/2023 | ......... G06Q 30/0282 |

OTHER PUBLICATIONS

"3rd Generation Partnership Project; Technical Specification Group Services and System Aspects; Procedures for the 5G System (5GS); Stage 2", 3GPP TS 23.502 V17.1.0, Jun. 2021, pp. 1-692.

"Clarify the NWDAF (MTLF) and NWDAF (AnLF)", SP-211292, 3GPP TSG-WG SA2 Meeting #147E e-meeting, S2-2107805, Elbonia, (revision of S2-2107533r03), Oct. 18-22, 2021, pp. 1-8.

"3GPP TS 23.288 V17.1.0", 3rd Generation Partnership Project; Technical Specification Group Services and System Aspects; Architecture enhancements for 5G System (5GS) to support network data analytics services (Release 17), Jun. 2021, pp. 1-192.

"3GPP TS 29.520 V17.3.0", 3rd Generation Partnership Project; Technical Specification Group Core Network and Terminals; 5G System; Network Data Analytics Services; Stage 3 (Release 17), Jun. 2021, pp. 1-125.

"3rd Generation Partnership Project; Technical Specification Group Services and System Aspects; Study on enablers for network automation for the 5G System (5GS); Phase 2 (Release 17)", 3GPP TR 23.700-91 V17.0.0, Dec. 2020, pp. 1-382.

"Clarify the content of ML model provisioning", 3GPP TSG-WG SA2 Meeting #148E e-meeting, Elbonia, S2-2109094, (revision of S2-2108535r06), Nov. 15-19, 2021, pp. 1-19.

"KI #1, Sol #5: Update to clarify the parameters for ML model discovery", 3GPP TSG-WG SA2 Meeting #142E, Elbonia, S2-2009351, (revision of S2-2008646r02), Nov. 16-20, 2020, pp. 1-19.

* cited by examiner

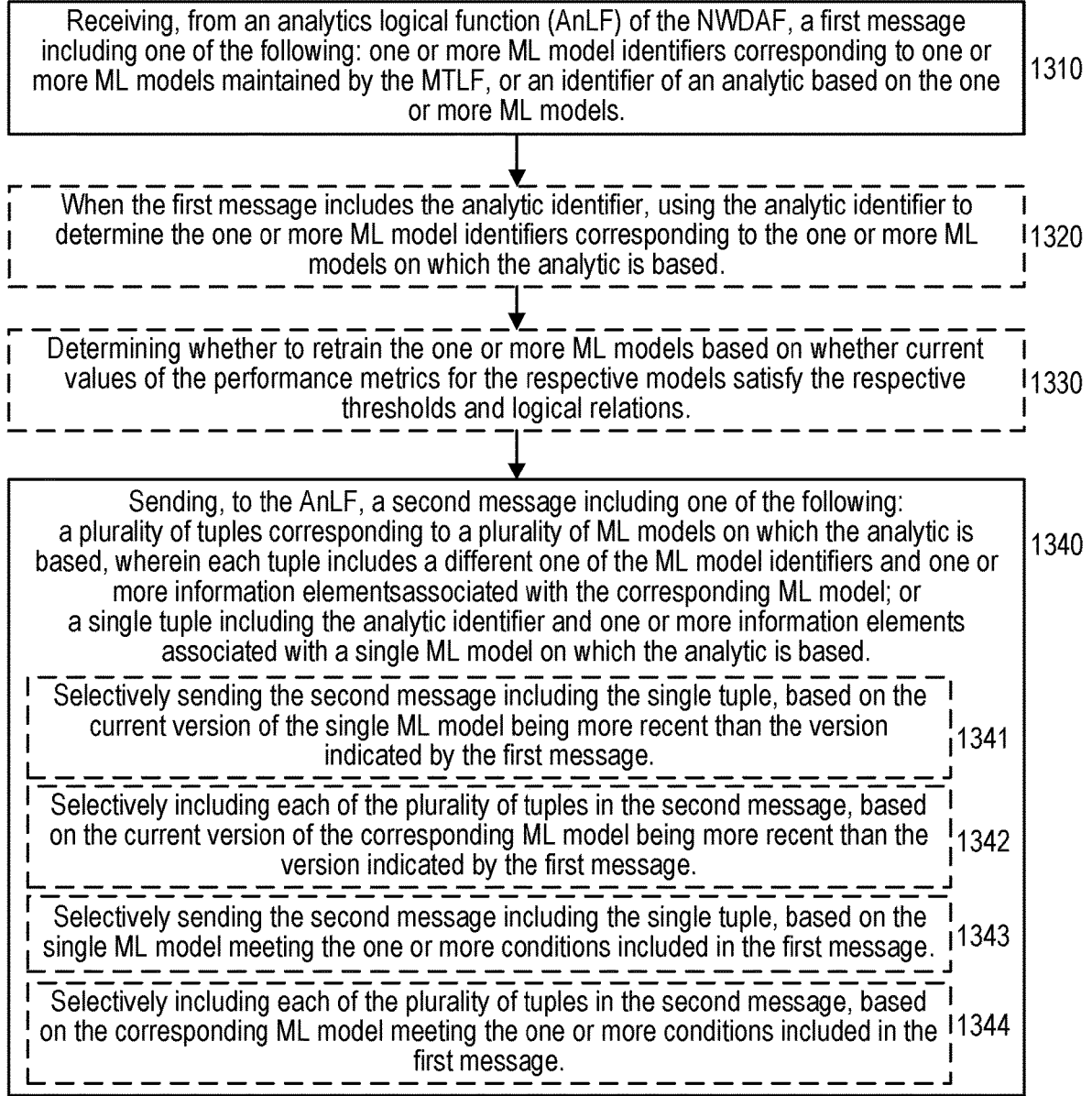

Receiving, from an analytics logical function (AnLF) of the NWDAF, a first message including one of the following: one or more ML model identifiers corresponding to one or more ML models maintained by the MTLF, or an identifier of an analytic based on the one or more ML models.     1310

When the first message includes the analytic identifier, using the analytic identifier to determine the one or more ML model identifiers corresponding to the one or more ML models on which the analytic is based.     1320

Determining whether to retrain the one or more ML models based on whether current values of the performance metrics for the respective models satisfy the respective thresholds and logical relations.     1330

Sending, to the AnLF, a second message including one of the following:
a plurality of tuples corresponding to a plurality of ML models on which the analytic is based, wherein each tuple includes a different one of the ML model identifiers and one or more information elementsassociated with the corresponding ML model; or
a single tuple including the analytic identifier and one or more information elements associated with a single ML model on which the analytic is based.     1340

Selectively sending the second message including the single tuple, based on the current version of the single ML model being more recent than the version indicated by the first message.     1341

Selectively including each of the plurality of tuples in the second message, based on the current version of the corresponding ML model being more recent than the version indicated by the first message.     1342

Selectively sending the second message including the single tuple, based on the single ML model meeting the one or more conditions included in the first message.     1343

Selectively including each of the plurality of tuples in the second message, based on the corresponding ML model meeting the one or more conditions included in the first message.     1344

*FIG. 13*

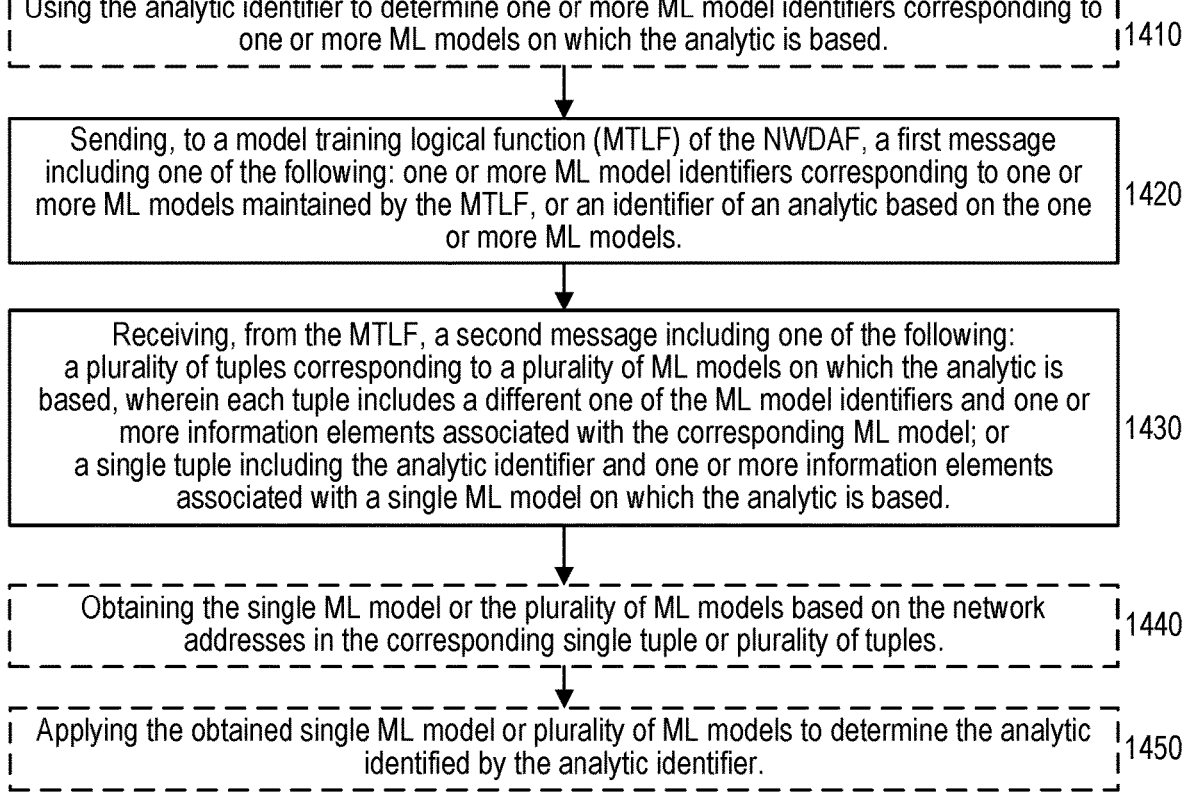

Using the analytic identifier to determine one or more ML model identifiers corresponding to one or more ML models on which the analytic is based. 1410

Sending, to a model training logical function (MTLF) of the NWDAF, a first message including one of the following: one or more ML model identifiers corresponding to one or more ML models maintained by the MTLF, or an identifier of an analytic based on the one or more ML models. 1420

Receiving, from the MTLF, a second message including one of the following: a plurality of tuples corresponding to a plurality of ML models on which the analytic is based, wherein each tuple includes a different one of the ML model identifiers and one or more information elements associated with the corresponding ML model; or a single tuple including the analytic identifier and one or more information elements associated with a single ML model on which the analytic is based. 1430

Obtaining the single ML model or the plurality of ML models based on the network addresses in the corresponding single tuple or plurality of tuples. 1440

Applying the obtained single ML model or plurality of ML models to determine the analytic identified by the analytic identifier. 1450

*FIG. 14*

MACHINE LEARNING (ML) MODEL MANAGEMENT IN 5G CORE NETWORK

TECHNICAL FIELD

The present application relates generally to the field of communication networks, and more specifically to techniques for generating analytics in a communication network based on machine learning (ML) models, including management of such models used in 5G core (5GC) networks.

INTRODUCTION

At a high level, the 5G System (5GS) consists of an Access Network (AN) and a Core Network (CN). The AN provides UEs connectivity to the CN, e.g., via base stations such as gNBs or ng-eNBs described below. The CN includes a variety of Network Functions (NF) that provide a wide range of different functionalities such as session management, connection management, charging, authentication, etc.

FIG. 1 illustrates a high-level view of an exemplary 5G network architecture, consisting of a Next Generation Radio Access Network (NG-RAN) 199 and a 5G Core (5GC) 198. NG-RAN 199 can include one or more gNodeB's (gNBs) connected to the 5GC via one or more NG interfaces, such as gNBs 100, 150 connected via interfaces 102, 152, respectively. More specifically, gNBs 100, 150 can be connected to one or more Access and Mobility Management Functions (AMFs) in the 5GC 198 via respective NG-C interfaces. Similarly, gNBs 100, 150 can be connected to one or more User Plane Functions (UPFs) in 5GC 198 via respective NG-U interfaces. Various other network functions (NFs) can be included in the 5GC 198, as described in more detail below.

In addition, the gNBs can be connected to each other via one or more Xn interfaces, such as Xn interface 140 between gNBs 100 and 150. The radio technology for the NG-RAN is often referred to as "New Radio" (NR). With respect the NR interface to UEs, each of the gNBs can support frequency division duplexing (FDD), time division duplexing (TDD), or a combination thereof. Each of the gNBs can serve a geographic coverage area including one or more cells and, in some cases, can also use various directional beams to provide coverage in the respective cells.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" with the term "AMF" referring to an access and mobility management function in the 5GC.

The NG RAN logical nodes shown in FIG. 1 include a Central Unit (CU or gNB-CU) and one or more Distributed Units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such controlling the operation of DUs. A DU (e.g., gNB-DUs 120, 130) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry.

A gNB-CU connects to one or more gNB-DUs over respective F1 logical interfaces, such as interfaces 122 and 132 shown in FIG. 1. However, a gNB-DU can be connected to only a single gNB-CU. The gNB-CU and connected gNB-DU(s) are only visible to other gNBs and the 5GC as a gNB. In other words, the F1 interface is not visible beyond gNB-CU.

Another change in 5G networks (e.g., in 5GC) is that traditional peer-to-peer interfaces and protocols found in earlier-generation networks are modified and/or replaced by a Service Based Architecture (SBA) in which Network Functions (NFs) provide one or more services to one or more service consumers. This can be done, for example, by Hyper Text Transfer Protocol/Representational State Transfer (HTTP/REST) application programming interfaces (APIs). In general, the various services are self-contained functionalities that can be changed and modified in an isolated manner without affecting other services.

Furthermore, the services are composed of various "service operations", which are more granular divisions of the overall service functionality. The interactions between service consumers and producers can be of the type "request/response" or "subscribe/notify". In the 5G SBA, network repository functions (NRF) allow every network function to discover the services offered by other network functions, and Data Storage Functions (DSF) allow every network function to store its context. This 5G SBA model is based on principles including modularity, reusability and self-containment of NFs, which can enable network deployments to take advantage of the latest virtualization and software technologies.

A 5GC NF that is of particular interest in the present disclosure is the Network Data Analytics Function (NWDAF). This NF provides network analytics information (e.g., statistical information of past events and/or predictive information) to other NFs.

Machine learning (ML) is a type of artificial intelligence (AI) that focuses on the use of data and algorithms to imitate the way that humans learn, gradually improving its accuracy. ML algorithms build models based on sample (or "training") data, with the models being used subsequently to make predictions or decisions. ML algorithms can be used in a wide variety of applications (e.g., medicine, email filtering, speech recognition, etc.) in which it is difficult or unfeasible to develop conventional algorithms to perform the needed tasks.

3GPP TS 23.288 (v17.2.0) specifies that NWDAF is the main network function for computing analytic reports and classifies NWDAF into two sub-functions (or logical functions): NWDAF Analytics Logical Function (NWDAF AnLF), which performs analytics procedures; and NWDAF Model Training Logical Function (NWDAF MTLF), which performs training and retraining of ML models used by NWDAF AnLF. The services used by these NWDAF logical functions work on an implicit assumption of a one-to-one relationship between ML model and Analytics identifier (ID), also referred to as "NwdafEvent". In this context, an Analytics ID is used to identify the type of analytics that NWDAF can generate, or a consumer of analytics is interested to receive.

SUMMARY

In certain scenarios, however, multiple ML models can be used to generate the analytic reports provided for a particular Analytics ID. For example, different ML models can be used to generate these analytic reports depending on location, time of day, network load, or any other information filtering parameter. As another example, these analytic reports can be generated by several cascading ML models. These ambiguities can cause various problems, issues, and/or difficulties for management of ML models and the analytics that they produce.

Embodiments of the present disclosure address these and other problems, issues, and/or difficulties, thereby facilitating the otherwise-advantageous deployment of ML models for analytics in 5G networks.

Some embodiments include exemplary methods (e.g., procedures) for a first network node or function (NNF) configured for ML model management in a communication network (e.g., 5GC).

These exemplary methods can include receiving, from a second NNF of the communication network, a first message including one of the following:
  one or more ML model identifiers corresponding to one or more ML models maintained by the first node, or
  when the ML model identifiers are not included, an identifier of an analytic based on the one or more ML models.
These exemplary methods can also include sending, to the second NNF, a second message including one of the following:
  a plurality of tuples corresponding to a plurality of ML models on which the analytic is based, wherein each tuple includes a different one of the ML model identifiers and one or more information elements associated with the corresponding ML model; or
  a single tuple including the analytic identifier and one or more information elements associated with a single ML model on which the analytic is based.

In some embodiments, for each tuple included in the second message, the one or more information elements include a network address, which is one of the following: a universal resource locator (URL), or a fully qualified domain name (FQDN). In some embodiments, each network address included in the second message is one of the following: an address from which the corresponding ML model can be obtained, or an address from which a manifest or a metadata file associated with the corresponding ML model can be obtained. In some of these embodiments, the manifest or the metadata file associated with each of the ML models includes the following:
  ML model identifier;
  identifier of one or more analytics that are based on the ML model;
  updated version of the ML model, where "updated" refers to the most recent version of the ML model that can be used for inference by the AnLF, since it has been trained and validated by the MTLF;
  creation timestamp of the updated version of the ML model; and
  network address from which the ML model can be obtained.

In some embodiments for each tuple included in the second message, the one or more information elements also include an updated version of the corresponding ML model. In some embodiments, when the first message includes the analytic identifier, these exemplary methods can also include using the (received) analytic identifier to determine one or more ML model identifiers corresponding to the one or more ML models on which the analytic is based.

In other embodiments, when the first message includes the one or more of ML model identifiers, the first message also indicates versions associated with corresponding ML models. In some of these embodiments, sending the second message includes one of the following:
  selectively sending the second message including the single tuple, based on the updated version of the single ML model being more recent than the version indicated by the first message; or
  selectively including each of the plurality of tuples in the second message, based on the updated version of the corresponding ML model being more recent than the version indicated by the first message.

In some embodiments, the first NNF is an MTLF of an NWDAF and the second NNF is an AnLF of the NWDAF. In some of these embodiments, the first message is an Nnwdaf_MLModelInfo_Request message and the second message is a response to the Nnwdaf_MLModelInfo_Request message.

In other embodiments, the first message is an Nnwdaf_MLModelProvision_Subscribe message and the second message is an Nnwdaf_MLModelProvision_Notify message. In some of these embodiments, the first message also includes one or more conditions that must be fulfilled for receiving the second message, including one or more of the following:
  performance metrics (or identifiers thereof) for the one or more ML models on which the analytic is based;
  respective thresholds for the performance metrics;
  logical relations between the performance metrics and the thresholds; and
  ML/AI framework constraints for execution of the one or more ML models.

In some variants, these exemplary methods can also include determining whether to retrain the one or more ML models based on whether current values of the performance metrics for the respective models satisfy the respective thresholds and logical relations (e.g., indicated in the first message). In some variants, sending the second message includes one of the following:
  selectively sending the second message including the single tuple, based on the single ML model meeting the one or more conditions included in the first message; or
  selectively including each of the plurality of tuples in the second message, based on the corresponding ML model meeting the one or more conditions included in the first message.

In some further variants, each tuple included in the second message also includes an identifier of a performance metric indicated in the first message and a value of the identified performance metric for the corresponding ML model.

Other embodiments include methods (e.g., procedures) for a second NNF configured for ML model management in a communication network (e.g., 5GC).

These exemplary methods can include sending, to a first NNF of the communication network, a first message including one of the following:
  one or more ML model identifiers corresponding to one or more ML models maintained by the first node, or
  when the ML model identifiers are not included, an identifier of an analytic based on the one or more ML models.
These exemplary methods can also include receiving, from the first node, a second message including one of the following:
  a plurality of tuples corresponding to a plurality of ML models on which the analytic is based, wherein each tuple includes a different one of the ML model identifiers and one or more information elements associated with the corresponding ML model; or a single tuple including the analytic identifier and one or more information elements associated with a single ML model on which the analytic is based.

In some embodiments, for each tuple included in the second message, the one or more information elements include a network address, which is a URL or a FQDN. In some embodiments, each network address included in the second message is one of the following: an address from which the corresponding ML model can be obtained, or an address from which a manifest or a metadata file associated with the corresponding ML model can be obtained.

In some of these embodiments, the manifest or the metadata file associated with each of the ML models includes the following:

ML model identifier;

identifier of one or more analytics that are based on the ML model;

updated version of the ML model;

creation timestamp of the updated version of the ML model; and network address from which the ML model can be obtained.

In other of these embodiments, these exemplary methods can also include the following operations: obtaining the single ML model or the plurality of ML models based on network addresses in the corresponding single tuple or plurality of tuples (e.g., included in the second message), and applying the obtained single ML model or plurality of ML models to determine the analytic identified by the analytic identifier.

In some embodiments, for each tuple included in the second message, the one or more information elements also include an updated version of the corresponding ML model. In some embodiments, when the first message includes the one or more of ML model identifiers, the first message also indicates versions associated with corresponding ML models. In some of these embodiments, one of more of the following applies:

the second message, including the single tuple, is received only when the updated version of the single ML model is more recent than the version indicated by the first message; and each of the plurality of tuples is received, in the second message, only when the updated version of the corresponding ML model is more recent than the version indicated by the first message.

In some embodiments, the first NNF is an MTLF of an NWDAF and the second NNF is an AnLF of the NWDAF. In some of these embodiments, the first message is an Nnwdaf_MLModelInfo_Request message and the second message is a response to the Nnwdaf_MLModelInfo_Request message.

In other of these embodiments, the first message is an Nnwdaf_MLModel-Provision_Subscribe message and the second message is an Nnwdaf_MLModelProvision_Notify message. In some of these embodiments, the first message also includes one or more conditions for receiving the second message, including one or more of the following:

performance metrics (or identifiers thereof) for the one or more ML models on which the analytic is based;

respective thresholds for the performance metrics;

logical relations between the performance metrics and the thresholds; and

ML/AI framework constraints for execution of the one or more ML models.

In some variants, one or more of the following applies:

the second message, including the single tuple, is received only when the single ML model meets the one or more conditions included in the first message; and each of the plurality of tuples is received, in the second message, only when the corresponding ML model meets the one or more conditions included in the first message.

In some further variants, or each tuple included in the second message, the one or more information elements also include an identifier of a performance metric indicated in the first message and a value of the identified performance metric for the corresponding ML model.

In some embodiments, these exemplary methods can also include using the analytic identifier to determine one or more ML model identifiers corresponding to the one or more ML models on which the analytic is based. In such case, the first message includes the determined one or more ML model identifiers.

Other embodiments include first and second NNFs (e.g., MTLFs and AnLFs or network nodes hosting the same) that are configured to perform the operations corresponding to any of the exemplary methods described herein. Other embodiments also include non-transitory, computer-readable media storing computer-executable instructions that, when executed by processing circuitry associated with such NNFs, configure the same to perform operations corresponding to any of the exemplary methods described herein.

These and other disclosed embodiments can enable an MTLF to identify the ML models it has retrained when notifying the AnLF, thereby enabling the AnLF to swap the specific ML model it is using for inference. As another example, embodiments can facilitate an AnLF to express conditions upon which the MTLF should retrain a ML model. As another example, embodiments can facilitate an MTLF to express training performance results so that it may decide whether it will swap ML models. At a high level, embodiments improve management of ML models used for analytics in communication networks (e.g., 5GC).

These and other objects, features, and advantages of the present disclosure will become apparent upon reading the following Detailed Description in view of the Drawings briefly described below.

BRIEF DESCRIPTION OF THE DRAWINGS

FIG. 13 shows an exemplary method (e.g., procedure) for a first node of a communication network, according to various embodiments of the present disclosure.

FIG. 14 shows an exemplary method (e.g., procedure) for a second node of a communication network, according to various embodiments of the present disclosure.

DETAILED DESCRIPTION

Figure 1:
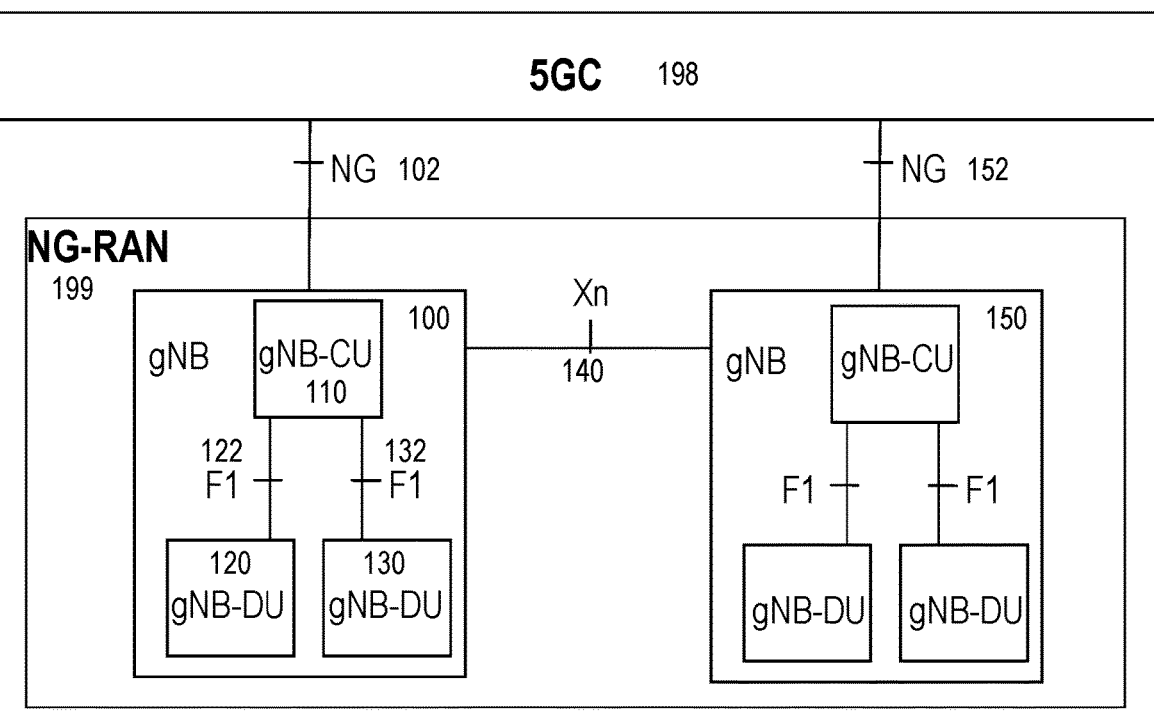
FIGS. 1-2 illustrate various aspects of an exemplary 5G network architecture.

Embodiments briefly summarized above will now be described more fully with reference to the accompanying drawings. These descriptions are provided by way of example to explain the subject matter to those skilled in the art and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features and advantages of the disclosed embodiments will be apparent from the following description.

Furthermore, the following terms are used throughout the description given below:

Core Network Node: As used herein, a "core network node" is any type of node in a core network. Some examples of a core network node include, e.g., a Mobility Management Entity (MME), a serving gateway (SGW), a Packet Data Network Gateway (P-GW), etc. A core network node can also be a node that implements a particular core network function (NF), such as an access and mobility management function (AMF), a session management function (AMF), a user plane function (UPF), a Service Capability Exposure Function (SCEF), or the like.

Network Node: As used herein, a "network node" is any node that is part of the core network (e.g., a core network node discussed above) of a telecommunications network. Functionally, a network node is equipment capable, configured, arranged, and/or operable to communicate directly or indirectly with a wireless or wired device and/or with other network nodes or equipment in the telecommunications network, to enable and/or provide wireless or wired access to the telecommunication device, and/or to perform other functions (e.g., administration) in the telecommunications network.

Node: As used herein, the term "node" (without any prefix) can be any type of node that is capable of operating in or with a telecommunication network (including a RAN and/or a core network), including a radio access node (or equivalent term), core network node, or telecommunications device.

Service: As used herein, the term "service" refers generally to a set of data, associated with one or more applications, which is to be transferred via a network with certain specific delivery requirements that need to be fulfilled in order to make the applications successful.

Component: As used herein, the term "component" refers generally to any component needed for the delivery of a service. Examples of component are RANs (e.g., E-UTRAN, NG-RAN, or portions thereof such as eNBs, gNBs, base stations (BS), etc.), CNs (e.g., EPC, 5GC, or portions thereof, including all type of links between RAN and CN entities), and cloud infrastructure with related resources such as computation, storage. In general, each component can have a "manager", which is an entity that can collect historical information about utilization of resources as well as provide information about the current and the predicted future availability of resources associated with that component (e.g., a RAN manager).

Note that the description given herein focuses on a 3GPP telecommunications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a telecommunications device or a network node may be distributed over a plurality of telecommunications devices and/or network nodes.

Figure 2:
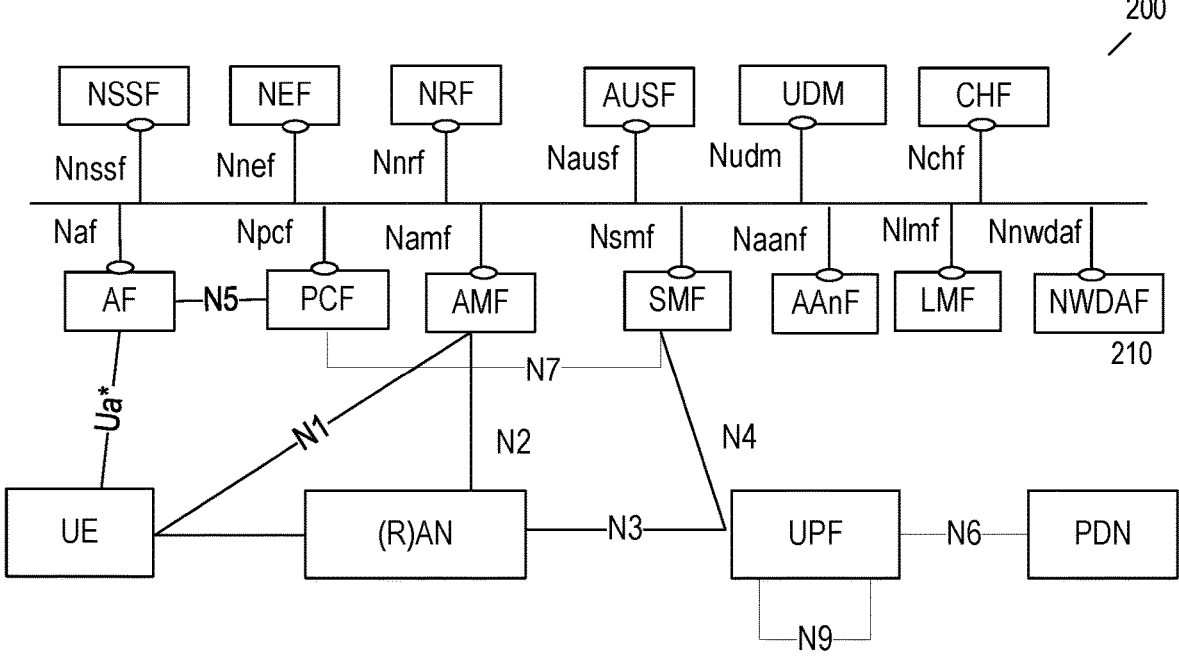

FIG. 2 shows an exemplary non-roaming 5G reference architecture with service-based interfaces and various 3GPP-defined NFs within the Control Plane (CP). These include the following NFs, with additional details provided for those most relevant to the present disclosure:

Application Function (AF, with Naf interface) interacts with the 5GC to provision information to the network operator and to subscribe to certain events happening in operator's network. An AF offers applications for which service is delivered in a different layer (i.e., transport layer) than the one in which the service has been requested (i.e., signaling layer), the control of flow resources according to what has been negotiated with the network. An AF communicates dynamic session information to PCF (via N5 interface), including description of media to be delivered by transport layer.

Policy Control Function (PCF, with Npcf interface) supports unified policy framework to govern the network behavior, via providing PCC rules (e.g., on the treatment of each service data flow that is under PCC control) to the SMF via the N7 reference point. PCF provides policy control decisions and flow based charging control, including service data flow detection, gating, QoS, and flow-based charging (except credit management) towards the SMF. The PCF receives session and media related information from the AF and informs the AF of traffic (or user) plane events.

User Plane Function (UPF)—supports handling of user plane traffic based on the rules received from SMF, including packet inspection and different enforcement actions (e.g., event detection and reporting). UPFs communicate with the RAN (e.g., NG-RNA) via the N3 reference point, with SMFs (discussed below) via the N4 reference point, and with an external packet data network (PDN) via the N6 reference point. The N9 reference point is for communication between two UPFs.

Session Management Function (SMF, with Nsmf interface) interacts with the decoupled traffic (or user) plane, including creating, updating, and removing Protocol Data Unit (PDU) sessions and managing session context with the User Plane Function (UPF), e.g., for event reporting. For example, SMF performs data flow detection (based on filter definitions included in PCC rules), online and offline charging interactions, and policy enforcement.

Charging Function (CHF, with Nchf interface) is responsible for converged online charging and offline charging functionalities. It provides quota management (for online charging), re-authorization triggers, rating conditions, etc. and is notified about usage reports from the SMF. Quota management involves granting a specific number of units (e.g., bytes, seconds) for a service. CHF also interacts with billing systems.

Access and Mobility Management Function (AMF, with Namf interface) terminates the RAN CP interface and handles all mobility and connection management of UEs (similar to MME in EPC). AMFs communicate with UEs via the N1 reference point and with the RAN (e.g., NG-RAN) via the N2 reference point.

Network Exposure Function (NEF) with Nnef interface-acts as the entry point into operator's network, by securely exposing to AFs the network capabilities and events provided by 3GPP NFs and by providing ways for the AF to securely provide information to 3GPP network. For example, NEF provides a service that allows an AF to provision specific subscription data (e.g., expected UE behavior) for various UEs.

Network Repository Function (NRF) with Nnrf interface-provides service registration and discovery, enabling NFs to identify appropriate services available from other NFs.

Network Slice Selection Function (NSSF) with Nnssf interface-a "network slice" is a logical partition of a 5G network that provides specific network capabilities and characteristics, e.g., in support of a particular service. A network slice instance is a set of NF instances and the required network resources (e.g., compute, storage, communication) that provide the capabilities and characteristics of the network slice. The NSSF enables other NFs (e.g., AMF) to identify a network slice instance that is appropriate for a UE's desired service.

Authentication Server Function (AUSF) with Nausf interface-based in a user's home network (HPLMN), it performs user authentication and computes security key materials for various purposes.

Network Data Analytics Function (NWDAF) with Nnwdaf interface, described in more detail above and below.

Location Management Function (LMF) with Nlmf interface-supports various functions related to determination of UE locations, including location determination for a UE and obtaining any of the following: DL location measurements or a location estimate from the UE; UL location measurements from the NG RAN; and non-UE associated assistance data from the NG RAN.

The Unified Data Management (UDM) function supports generation of 3GPP authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

The NRF allows every NF to discover the services offered by other NFs, and Data Storage Functions (DSF) allow every NF to store its context. In addition, the NEF provides exposure of capabilities and events of the 5GC to AFs within and outside of the 5GC. For example, NEF provides a service that allows an AF to provision specific subscription data (e.g., expected UE behavior) for various UEs.

Communication links between the UE and a 5G network (AN and CN) can be grouped in two different strata. The UE communicates with the CN over the Non-Access Stratum (NAS), and with the AN over the Access Stratum (AS). All the NAS communication takes place between the UE and the AMF via the NAS protocol (N1 interface in FIG. 2). Security for the communications over this these strata is provided by the NAS protocol (for NAS) and the PDCP protocol (for AS).

3GPP Rel-17 enhances the SBA by adding a Data Management Framework that includes a Data Collection Coordination Function (DCCF) and a Messaging Framework Adaptor Function (MFAF), which are defined in detail in 3GPP TR 23.700-91 (v17.0.0). The Data Management Framework is backward compatible with a Rel-16 NWDAF function, described above. For Rel-17, the baseline for services offered by the DCCF (e.g., to an NWDAF Analytics Function) are the Rel-16 NF Services used to obtain data. For example, the baseline for the DCCF service used by an NWDAF consumer to obtain UE mobility data is Namf_EventExposure.

As mentioned above, 3GPP TS 23.288 (v17.2.0) specifies that NWDAF is the main network function for computing analytic reports. The 5G system architecture allows any NF to obtain analytics from an NWDAF using a DCCF function and associated Ndccf services. The NWDAF can also perform storage and retrieval of analytics information from an Analytics Data Repository Function (ADRF).

3GPP TS 23.288 also classifies NWDAF into two subfunctions (or logical functions): NWDAF Analytics Logical Function (NWDAF AnLF), which performs analytics procedures; and NWDAF Model Training Logical Function (NWDAF MTLF), which performs training and retraining of ML models used by NWDAF AnLF.

3GPP TS 23.288 specifies a subscribe/notify procedure for a consumer NF to retrieve ML model(s) associated with one or more Analytics IDs whenever a new ML model has been trained by the NWDAF MTLF and becomes available. This is referred to as ML Model Provisioning and is implemented by the Nnwdaf_MLModelProvision service.

Figure 3:
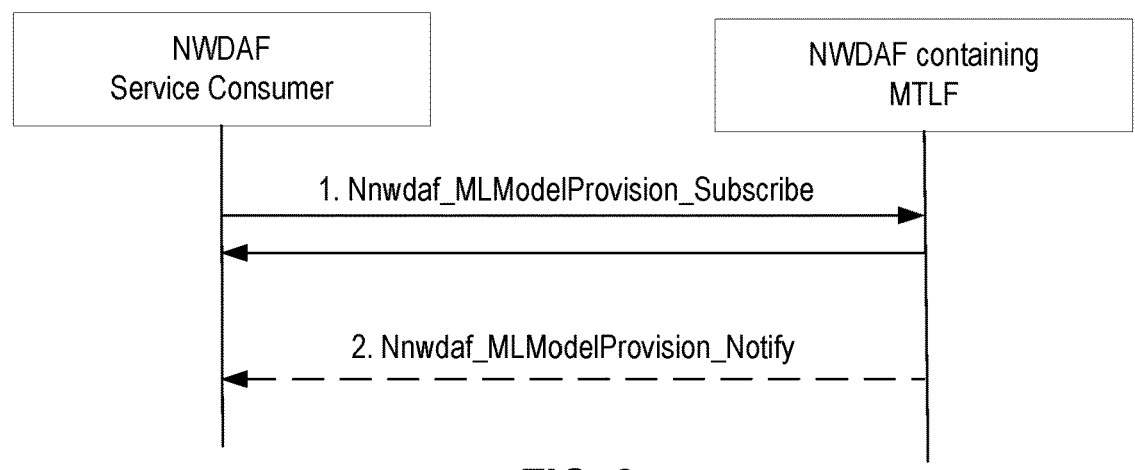
FIG. 3 shows an exemplary procedure for an NWDAF service consumer to subscribe for notifications about ML model availability from an NWDAF (MTLF).

FIG. 3 shows an exemplary procedure for an NWDAF service consumer (e.g., NWDAF AnLF) to subscribe for notifications about ML model availability from a NWDAF (MTLF). As mentioned above, the procedure is implemented based on Nnwdaf_MLModel-Provision_Subscribe and Nnwdaf_MLModelProvision_Notify messages that are part of the Nnwdaf_MLModelProvision service. 3GPP TS 23.288 section 6.2A describes the procedure in more detail.

Figure 4:
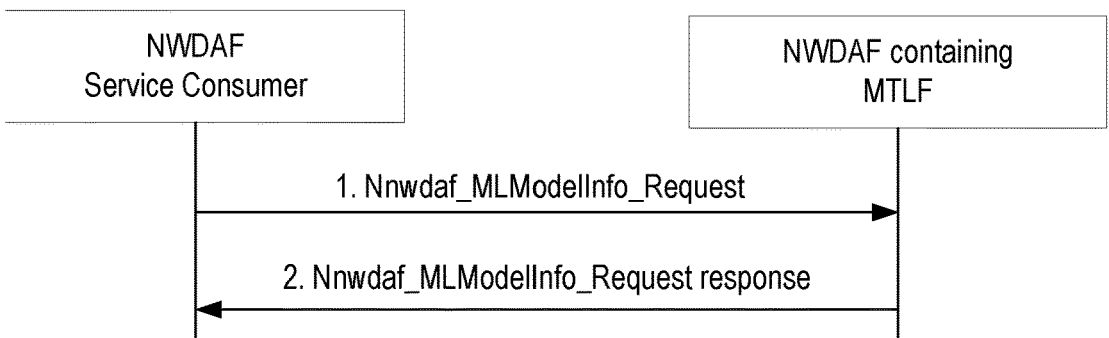
FIG. 4 shows an exemplary procedure for an NWDAF service consumer to retrieve information about ML model(s) from an NWDAF (MTLF).

3GPP TS 23.288 also specifies a request/response procedure for consumer NF (e.g., NWDAF AnLF) to retrieve information about ML model(s) associated with one or more Analytics IDs. This procedure is implemented by the Nnwdaf_MLModelInfo service and is illustrated in FIG. 4.

As briefly mentioned above, these services used by the two NWDAF logical functions work on an implicit assumption of a one-to-one relationship between ML model and Analytics ID. In certain scenarios, however, multiple ML models can be used to generate the analytic reports provided for a particular Analytics ID. For example, different ML models can be used to generate these analytic reports depending on location, time of day, network load, or any other information filtering parameter. As another example, these analytic reports can be generated by several cascading ML models.

Figure 5:
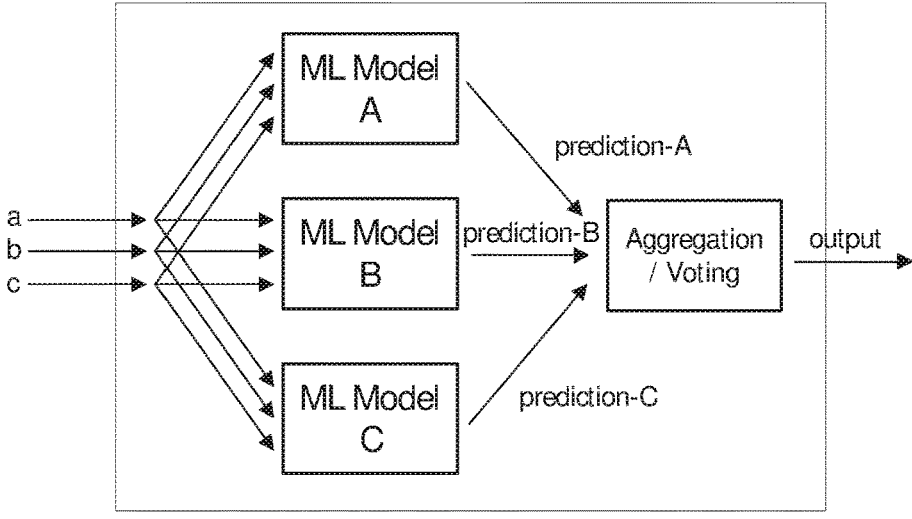
FIGS. 5-7 show different exemplary scenarios where one Analytics ID can be served by several ML models.

FIG. 5 shows one exemplary scenario in which one Analytics ID can be served by several ML models. In this scenario, three different ML models (A-C) generate respective predictions (A-C) based on the same inputs (a-c). An aggregation/voting function aggregates the predictions to generate the system output.

Figure 6:
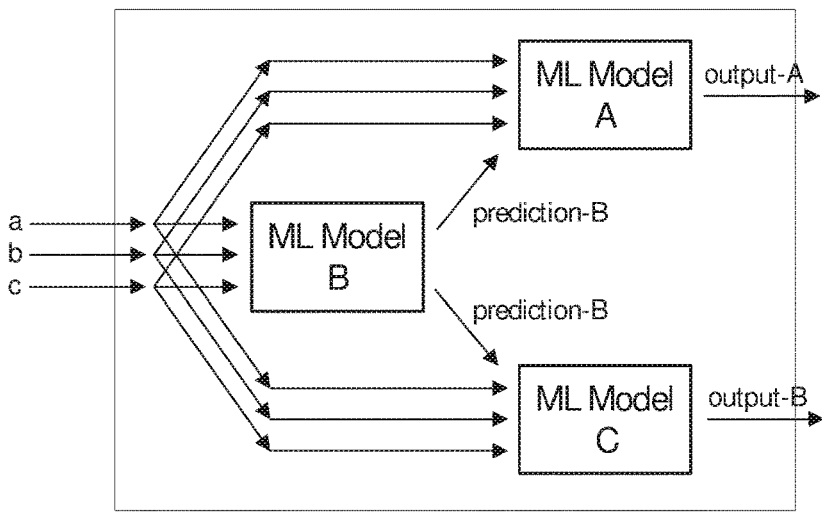

FIG. 6 shows another exemplary scenario in which one Analytics ID can be served by several ML models. In this scenario, three different ML models (A-C) receive the system inputs (a-c) and ML model (B) provides two predictions (B-C) that are also inputs to the other two ML models (A, C), which provide respective system outputs (A-B). In some scenarios, one or both of ML models (A, C) may be used depending on various conditions.

Figure 7:
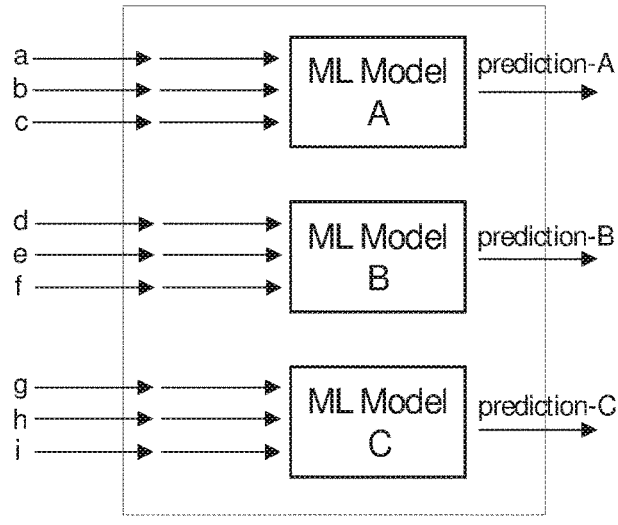

FIG. 7 shows another exemplary scenario in which one Analytics ID can be served by several ML models. In this scenario, the system includes three different ML models (A-C), each of receives different inputs and generates a different prediction than the other two ML models.

However, only one of the ML models is used at any given time based on various conditions associated with the respective inputs. As such, the system output at any particular time is dependent on which ML model is in use.

For the Nnwdaf_MLModelProvision services discussed above, if the NWDAF (MTLF) retrains one of the ML models associated with an Analytics ID and this ML model has no one-to-one relationship with an Analytics Filter, the notification is not meaningful enough for the NWDAF (AnLF). In other words, the subscription request does not include an Analytics Filter (just the Analytics ID) and therefore the NWDAF (MTLF) returns the location of the only ML model (out of several ML models) it has retrained. That information alone is not enough for the NWDAF (AnLF) to determine which ML model(s) it must swap.

Similar issues arise for the Nnwdaf_MLModelInfo services discussed above. The specification does not detail how to specify the particular ML model related to the meta-information carried by the service response. Rather, the service consumer is expected to specify the ML model of interest, but this is not possible as discussed above.

Additionally, although the response to an Nnwdaf_MLModelInfo request includes ML model metadata, the actual contents are not specified. The NWDAF (AnLF) usually needs additional information to execute a ML model for inference. Such information can include ML model dependencies, supported execution platforms, instructions to run additional software components that could be needed to run the ML model, etc. Since AI/ML is a continuously evolving area where new platform and new technologies emerge, it is not possible to standardize all existing options in advance.

Accordingly, embodiments of the present disclosure address these and other problems, issues, and/or difficulties by providing an improved technique for provisioning of ML models by introducing explicit references to ML models, to the conditions to train ML models in the NWDAF (MTLF), and/or conditions to swap ML models in the NWDAF (AnLF). These techniques provide various benefits and/or advantages. For example, they facilitate an NWDAF (MTLF) to identify the ML models it has retrained when notifying the NWDAF (AnLF), thereby enabling the NWDAF (AnLF) to swap the specific ML model it is using for inference. As another example, they facilitate an NWDAF (AnLF) to express the conditions upon which the NWDAF (MTLF) should aim to retrain a ML model, and, upon retraining of the ML model, whether it must notify the NWDAF (AnLF). As another example, they facilitate an NWDAF (MTLF) to express training performance results so that it may decide whether it will swap ML models. At a high level, embodiments improve management of ML models used for analytics in communication networks (e.g., 5GC).

The abbreviations "MTLF", "NWDAF (MTLF)", and "MTLF of an NWDAF" are used interchangeably herein. Likewise, the abbreviations "AnLF", "NWDAF (AnLF)", and "AnLF of an NWDAF" are used interchangeably herein.

Figure 8:
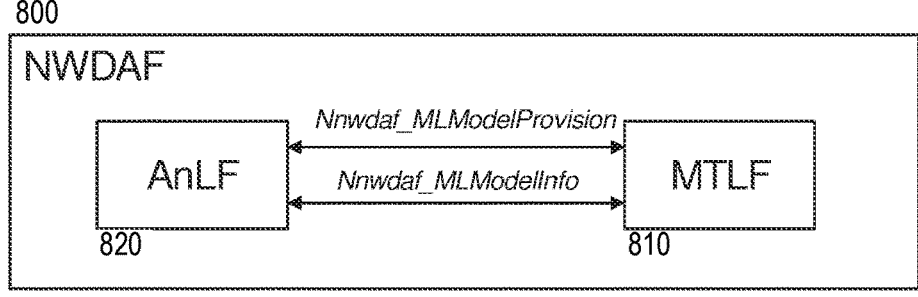
FIG. 8 shows a block diagram of an NWDAF, according to various embodiments of the present disclosure.

FIG. 8 shows a block diagram of an NWDAF according to various embodiments of the present disclosure. The NWDAF shown in FIG. 8 includes an AnLF and an MTLF that interact via Nnwdaf_MLModelProvision and Nnwdaf_MLModelInfo services. Embodiments retain the split existing AnLF/MTLF functional but updates the service operations in Nnwdaf_MLModelProvision and Nnwdaf_MLModelInfo services. Additionally, MTLF functionality is improved such that upon receiving a Nnwdaf_MLModelProvision_Subscribe request, the MTLF considers conditions in existing subscriptions before training a new ML model.

According to various embodiments, a new ML model identifier information element is added to Nnwdaf_MLModelProvision_Subscribe request and to Nnwdaf_MLModelInfo_Request. This ML model identifier may replace the Analytics ID in the request and can be used for filtering the request. Several instances of the ML model identifier can be included in a request, enabling the requesting of several ML models affecting the same Analytics ID. In some embodiments, the consumer (e.g., AnLF) may include within the Nnwdaf_MLModel-Provision_Subscribe request a list of its supported capabilities, as an additional filtering option, so that it receives notifications only for retrained ML model(s) matching the indicated capabilities.

In various embodiments, the Nnwdaf_MLModelProvision_Notify message can retain its existing structure, carrying a set of tuples. Each tuple can include the following information:

| IE name | Presence | Existing/New/Modified |
|---|---|---|
| Analytics ID | Optional (no ML model identifier) | Existing |
| ML Model Identifier | Optional | New |
| ML Model Version | Optional | New |
| URL for ML model manifest or artifact | Optional | Modified |

In various embodiments, the Nnwdaf_MLModelInfo_Request response message can retain its existing structure, carrying a set of tuples. Each tuple can include the following information:

| IE name | Presence | Existing/New/Modified |
|---|---|---|
| Analytics ID | Optional (no ML model identifier) | Existing |
| ML Model Identifier | Optional | New |
| ML Model Version | Optional | New |
| URL for ML metadata | Optional | Existing |

The ML model meta-data (also called "manifest") can include information about versions, location, performance, requirements, etc.

Various embodiments will now be described in more detail, first in relation to the Nnwdaf_MLModelProvision service and then in relation to the Nnwdaf_MLModelInfo service.

3GPP TS 23.288 section 7.5.2 specifies the following data included in an Nnwdaf_MLModelProvision_Subscribe request:

Inputs, Required: (set of) Analytics ID(s) defined in Table 7.1-2, Notification Target Address (+Notification Correlation ID).

Inputs, Optional: Subscription Correlation ID (in the case of modification of the ML model subscription), Analytics Filter information to indicate the conditions for which ML model for the analytics is requested, and Target of Analytics Reporting to indicate the object(s) for which ML model for the analytics is requested, entities such as specific UEs, a group of UE(s) or any UE (i.e. all UEs), ML Model target period, Expiry time.

Various embodiments of the present disclosure provide one or more of the following improvements to the existing Nnwdaf_MLModelProvision_Subscribe request:

Making the Analytics ID(s) optional, i.e., not included when a ML Model Identifier is included.

Including a (set of) ML model identifiers as optional parameters. The request must include an Analytics ID or a Model identifier. If only an Analytics ID is included, this is used as a filter in order to select the ML models the notification refers to.

When an ML model identifier is included, a ML Model Version can also be included. The NWDAF (AnLF), as consumer, may subscribe to receive notifications about a new ML model version after the first version was deployed. By including the ML Model Version in the request, the consumer states that it requires notification only if the version is greater (more recent) than the version identified by the ML Model Version.

Including additional conditions as filters for the NWDAF (MTLF) to notify the consumer upon ML model retrain, e.g., no notification is issued by the NWDAF (MTLF) unless the new ML model meets these, such as:

performance metrics of interest (or identifiers thereof, e.g., "mse" for Mean Squared Error, "rmse" for Root Mean Squared Error, or "mae" for Mean Absolute Error; this list is not exhaustive and depends on the type of ML model);

thresholds for the performance metrics;

logical relations between performance metrics and thresholds (i.e., "gt" for "greater than", "lt" for "less than" . . . ); and ML/AI framework constraints, e.g., the new ML model must be runnable in a ML/AI framework of specific type and version.

Figure 9:
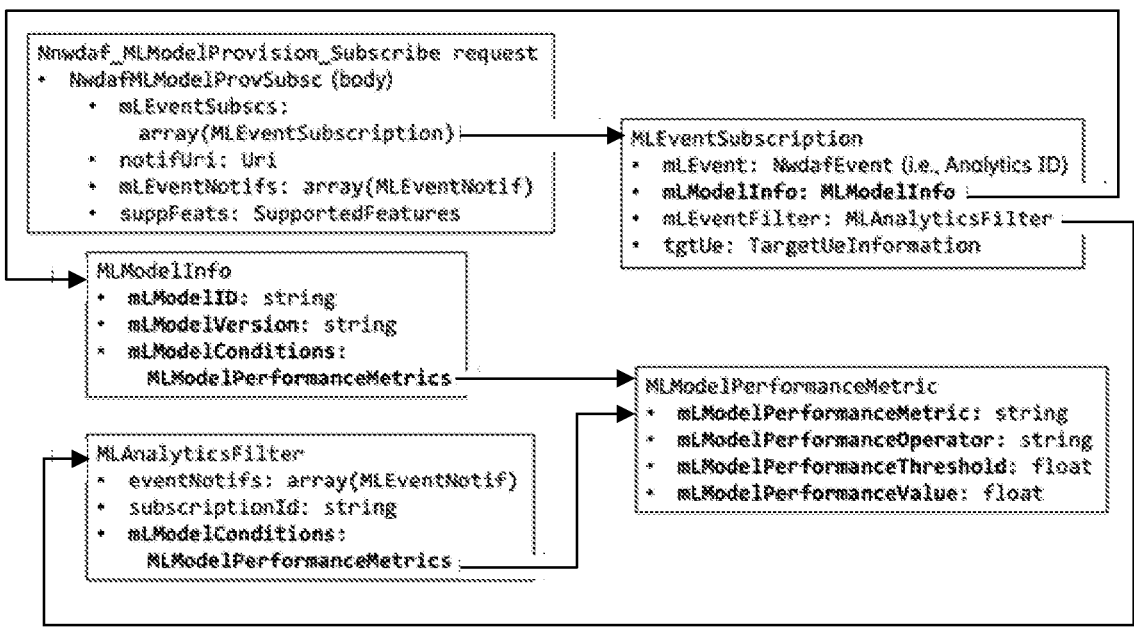
FIG. 9 shows a data structure for an exemplary Nnwdaf_MLModelProvision_Subscribe request message, according to various embodiments of the present disclosure.

3GPP TS 29.520 (v17.3.0) section 5.4.6.2.2 specifies the existing Nnwdaf_MLModel-Provision_Subscribe request message. FIG. 9 shows a data structure for an exemplary Nnwdaf_MLModelProvision_Subscribe request message according to various embodiments of the present disclosure. Each arrow runs from an instance of an object in the data structure to a corresponding description (or type) of that object. New fields include mlModelInfo in MLEventSubscription and mlModelConditions in MLAnalyticsFilter, which are defined by their corresponding types shown in FIG. 9.

3GPP TS 23.288 section 6.2A.1 specifies that when a subscription request is received, an NWDAF (MTLF) may determine whether further training for an existing trained ML models is needed to satisfy the subscription. The standard states that this determination is done based on implementation logic without specifying such logic.

In some embodiments, the NWDAF (MTLF) explicitly checks conditions provided in the notification subscription to determine whether retraining is needed. Additionally, the NWDAF (MTLF) informs the consumer/subscriber that even if the retraining is carried out according to conditions, the notifications may be provided conditionally. For example, the NTWDAF (MTLF) can inform the consumer that it will notified only if the performance metrics of the retrained ML model match the conditions in the subscription.

3GPP TS 23.288 section 7.5.4 specifies the following data included in an Nnwdaf_MLModelProvision_Notify message:

Inputs, Required: Set of the tuple (Analytics ID, address (e.g., URL or FQDN) of Model file), Notification Correlation Information.

Inputs, Optional: Validity period, Spatial validity.

Various embodiments of the present disclosure provide one or more of the following improvements to the existing Nnwdaf_MLModelProvision_Notify request, for each tuple in the message:

Adding a ML Model Identifier, which can be omitted when only one ML model is involved in the Analytics ID implementation;

Adding a ML Model Version; and

Adding the identifier of the performance metric and the value of the performance metric obtained when training the ML model, when the identifier of the performance metric is present in the corresponding subscription request.

The URL mentioned above can be a ML Model URL (from which the ML model can be obtained) or a ML Model Manifest URL that points to the ML model metadata (or a description thereof). For example, the ML model metadata may include additional information for the NWDAF (AnLF) to execute the ML model as well as the actual URL of the ML model. This makes it more flexible to include further information related to the model execution without the need to encode each attribute as part of the service operation.

Figure 10:
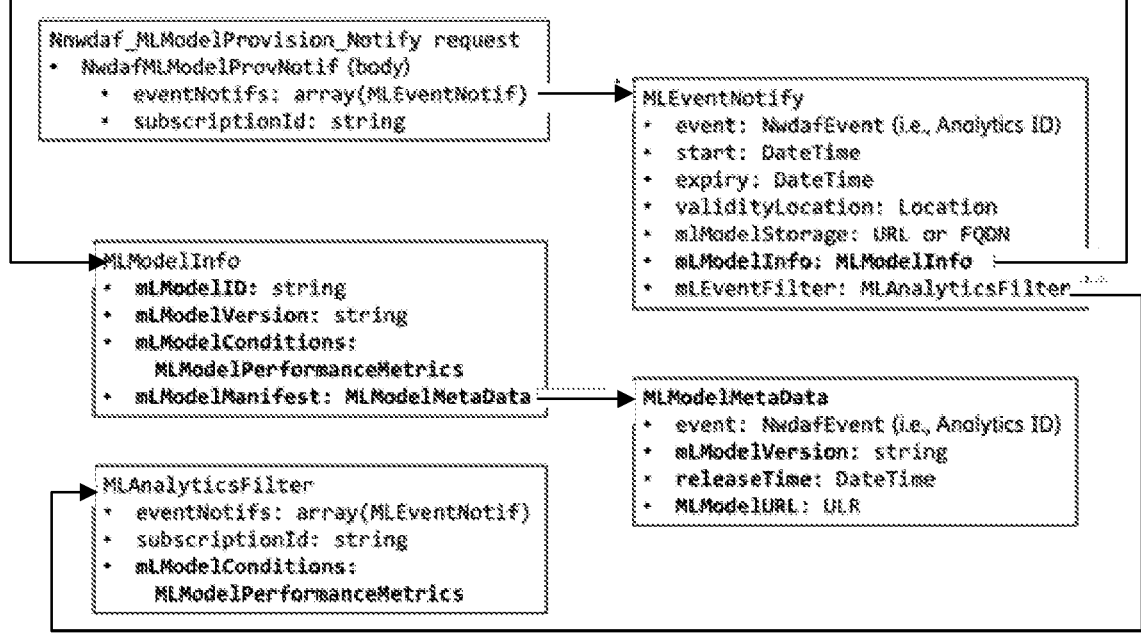
FIG. 10 shows a data structure for an exemplary Nnwdaf_MLModelProvision_Notify request message, according to various embodiments of the present disclosure.

3GPP TS 29.520 (v17.3.0) section 5.4.6.2.5 specifies the existing Nnwdaf_MLModel-Provision_Notify request message. FIG. 10 shows a data structure for an exemplary Nnwdaf_MLModelProvision_Notify request message according to various embodiments of the present disclosure. Each arrow runs from an instance of an object in the data structure to a corresponding description (or type) of that object. New fields include mlModelInfo in MLEventNotify and mlModelConditions in MLAnalyticsFilter, which are defined by their corresponding types. Note that the type MLModelPerformanceMetric can be the same as in FIG. 9. MLModelMetadata type is also updated to include some additional fields.

In other embodiments, the Nnwdaf_MLModelInfo service described in 3GPP TS 23.288 section 7.6 can be improved in a similar manner as the Nnwdaf_MLModel-Provision service discussed above, but without specifics for the ML model training. 3GPP TS 23.288 specifies the following data included in the Nnwdaf_MLModelInfo_Request request message:

Inputs, Required: (Set of) Analytics ID(s) defined in Table 7.1-2.

Inputs, Optional: Analytics Filter information to indicate the conditions for which ML model for the analytics is requested, and Target of Analytics Reporting to indicate the object(s) for which ML model for the analytics is requested (e.g., specific UEs, a group of UE(s) or any UE (i.e., all UEs)), ML Model target period.

Various embodiments of the present disclosure provide one or more of the following improvements to the existing Nnwdaf_MLModelInfo_Request request message:

Making the Analytics ID(s) optional, i.e., not included when a ML Model Identifier is included.

Including a (set of) ML model identifiers as optional parameters. The request must include an Analytics ID or a Model identifier. If only an Analytics ID is included, this is used as a filter in order to select the ML models the notification refers to.

When an ML model identifier is included, a ML Model Version can also be included.

Figure 11:
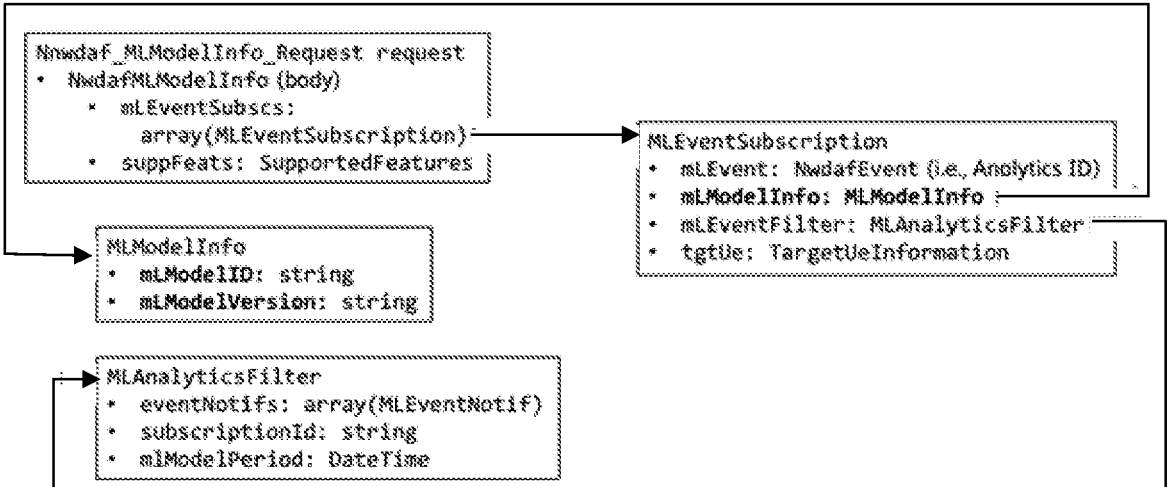
FIG. 11 shows a data structure for an exemplary Nnwdaf_MLModelInfo_Request request message, according to various embodiments of the present disclosure.

FIG. 11 shows a data structure for an exemplary Nnwdaf_MLModelInfo_Request request message, according to various embodiments of the present disclosure. Each arrow runs from an instance of an object in the data structure to a corresponding description (or type) of that object. New fields include mlModelInfo in MLEventSubscription.

3GPP TS 23.288 specifies the following data included in the Nnwdaf_MLModelInfo_Request response message:

Outputs, Required: Set of tuples (Analytics ID, address of Model file), where address is an URL or a fully qualified domain name (FQDN).

Outputs, Optional: Validity period, Spatial validity.

Various embodiments of the present disclosure provide one or more of the following improvements to the existing Nnwdaf_MLModelInfo_Request response message, particularly for each tuple in the message:

Adding a ML Model Identifier, which can be omitted when only one ML model is involved in the Analytics ID implementation.

Indicating that the URL refers to a ML Model Manifest, which must include the following mandatory items:

ML Model Identifier.

Analytics ID where the ML model is used.

Updated ML Model Version.

Creation timestamp of the updated version of the ML Model.

ML Model URL.

Figure 12:
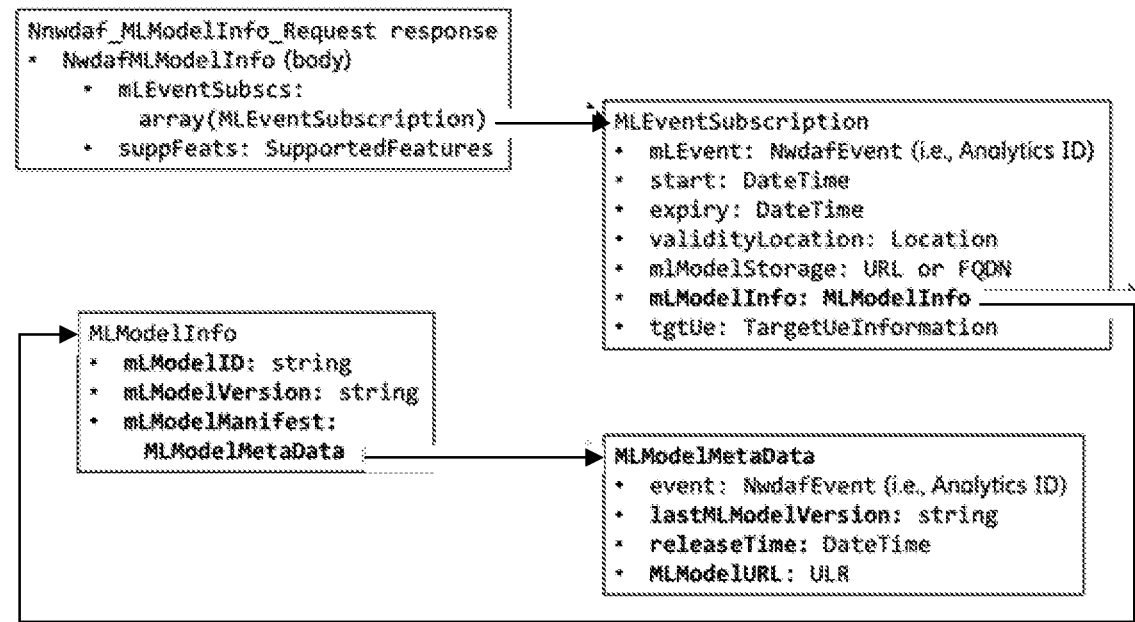
FIG. 12 shows a data structure for an exemplary Nnwdaf_MLModelInfo_Request response message, according to various embodiments of the present disclosure.

FIG. 12 shows a data structure for an exemplary Nnwdaf_MLModelInfo_Request response message, according to various embodiments of the present disclosure. Each arrow runs from an instance of an object in the data structure to a corresponding description (or type) of that object. New fields include mlModelInfo in MLEventSubscription, which is defined by its corresponding type MLModelInfo. MLModelMetadata type is also updated to include some additional fields.

The embodiments described above can be further illustrated with reference to FIGS. 13-14, which depict exemplary methods (e.g., procedures) for an MTLF and an AnLF, respectively, of a NWDAF. Put differently, various features of the operations described below correspond to various embodiments described above. The exemplary methods shown in FIGS. 13-14 can be used cooperatively (e.g., with each other and with other procedures described herein) to provide benefits, advantages, and/or solutions to problems described herein. Although the exemplary methods are illustrated in FIGS. 13-14 by specific blocks in particular orders, the operations corresponding to the blocks can be performed in different orders than shown and can be combined and/or divided into blocks and/or operations having different functionality than shown. Optional blocks and/or operations are indicated by dashed lines.

In particular, FIG. 13 illustrates an exemplary method (e.g., procedure) for a first network node or function (NNF) configured for ML model management in a communication network (e.g., 5GC), according to various embodiments of the present disclosure. For example, the exemplary method shown in FIG. 13 can be performed by an NWDAF (MTLF) or a network node hosting an NWDAF (MTLF), such as described elsewhere herein.

The exemplary method can include the operations of block 1310, where the first NNF can receive, from a second NNF of the communication network, a first message including one of the following:

one or more ML model identifiers corresponding to one or more ML models maintained by the MTLF, or an identifier of an analytic based on the one or more ML models (e.g., when the ML model identifiers are not included).

The exemplary method can also include the operations of block 1340, where the first NNF can send, to the AnLF, a second message including one of the following:

a plurality of tuples corresponding to a plurality of ML models on which the analytic is based, wherein each tuple includes a different one of the ML model identifiers and one or more information elements associated with the corresponding ML model; or a single tuple including the analytic identifier and one or more information elements associated with a single ML model on which the analytic is based.

In some embodiments, for each tuple included in the second message, the one or more information elements include a network address, which is one of the following: a universal resource locator (URL), or a fully qualified domain name (FQDN). In some embodiments, each network address included in the second message is one of the following: an address from which the corresponding ML model can be obtained, or an address from which a manifest or a metadata file associated with the corresponding ML model can be obtained. In some of these embodiments, the manifest or the metadata file associated with each of the ML models includes the following:

ML model identifier;

identifier of one or more analytics that are based on the ML model;

updated version of the ML model, where "updated" refers to the most recent version of the ML model that can be used for inference by the AnLF, since it has been trained and validated by the MTLF;

creation timestamp of the updated version of the ML model; and network address from which the ML model can be obtained.

In some embodiments for each tuple included in the second message, the one or more information elements also include an updated version of the corresponding ML model. In some embodiments, when the first message (e.g., in block 1310) includes the analytic identifier, the exemplary method can also include the operations of block 1320, where the first NNF can use the (received) analytic identifier to determine one or more ML model identifiers corresponding to the one or more ML models on which the analytic is based.

In other embodiments, when the first message includes the one or more of ML model identifiers, the first message also indicates versions associated with corresponding ML models. For example, the version included in the first message is the version of the ML model used for inference by the second NNF when the first message is sent. When a new version of the ML model is trained by the first NNF, it will be assigned a greater (more recent) version identifier. In some of these embodiments, sending the second message in block 1340 includes one of the following operations, identified with corresponding sub-block numbers:

(1341) selectively sending the second message including the single tuple, based on the updated version of the single ML model being more recent than the version indicated by the first message; or (1342) selectively including each of the plurality of tuples in the second message, based on the updated version of the corresponding ML model being more recent than the version indicated by the first message.

In some embodiments, the first NNF is an MTLF of an NWDAF and the second NNF is an AnLF of the NWDAF. In some of these embodiments, the first message is an Nnwdaf_MLModelInfo_Request message (e.g., FIG. 11) and the second message is a response to the Nnwdaf_MLModelInfo_Request message (e.g., FIG. 12). FIG. 4 shows an example signaling diagram for these messages.

In other of these embodiments, the first message is an Nnwdaf_MLModel-Provision_Subscribe message (e.g., FIG. 9) and the second message is an Nnwdaf_MLModel-Provision_Notify message (e.g., FIG. 10). FIG. 3 shows an example signaling diagram for these messages. In some of these embodiments, the first message also includes one or more conditions for receiving the second message, including one or more of the following:

performance metrics (or identifiers thereof) for the one or more ML models on which the analytic is based;

respective thresholds for the performance metrics;

logical relations between the performance metrics and the thresholds; and

ML/AI framework constraints for execution of the one or more ML models.

In some variants, the exemplary method can also include the operations of block 1330, where the first NNF can determine whether to retrain the one or more ML models based on whether current values of the performance metrics for the respective models satisfy the respective thresholds and logical relations (e.g., indicated in the first message).

In some variants, sending the second message in block 1340 includes one of the following operations, identified with corresponding sub-block numbers:

(1343) selectively sending the second message including the single tuple, based on the single ML model meeting the one or more conditions included in the first message; or (1344) selectively including each of the plurality of tuples in the second message, based on the corresponding ML model meeting the one or more conditions included in the first message.

In some further variants, for each tuple included in the second message, the one or more information elements also include an identifier of a performance metric indicated in the first message and a value of the identified performance metric for the corresponding ML model.

In addition, FIG. 14 illustrates an exemplary method (e.g., procedure) for a second NNF configured for ML model management in a communication network (e.g., 5GC), according to various embodiments of the present disclosure. For example, the exemplary method shown in FIG. 14 can be performed by an NWDAF (AnLF) or a network node hosting an NWDAF (AnLF), such as described elsewhere herein.

The exemplary method can include the operations of block 1420, where the second NNF can send, to a first NNF of the communication network, a first message including one of the following:

one or more ML model identifiers corresponding to one or more ML models maintained by the MTLF, or an identifier of an analytic based on the one or more ML models (e.g., when the ML model identifiers are not included).

The exemplary method can also include the operations of block 1430, where the second NNF can receive, from the MTLF, a second message including one of the following:

a plurality of tuples corresponding to a plurality of ML models on which the analytic is based, wherein each tuple includes a different one of the ML model identifiers and one or more information elements associated with the corresponding ML model; or a single tuple including the analytic identifier and one or more information elements associated with a single ML model on which the analytic is based.

In some embodiments, for each tuple included in the second message, the one or more information elements include a network address, which is a URL or a FQDN. In some embodiments, each network address included in the second message is one of the following: an address from which the corresponding ML model can be obtained, or an address from which a manifest or a metadata file associated with the corresponding ML model can be obtained.

In some of these embodiments, the manifest or the metadata file associated with each of the ML models includes the following:

ML model identifier;

identifier of one or more analytics that are based on the ML model;

updated version of the ML model;

creation timestamp of the updated version of the ML model; and network address from which the ML model can be obtained.

In other of these embodiments, the exemplary method can also include the operations of blocks 1440-1450, where the second NNF can obtain the single ML model or the plurality of ML models based on network addresses in the corresponding single tuple or plurality of tuples (e.g., included in the second message), and apply the obtained single ML model or plurality of ML models to determine the analytic identified by the analytic identifier.

In some embodiments, for each tuple included in the second message, the one or more information elements also include an updated version of the corresponding ML model. In some embodiments, when the first message includes the one or more of ML model identifiers, the first message also indicates versions associated with corresponding ML models. As mentioned above, the version included in the first message can be the version of the ML model used for inference by the second NNF when the first message is sent. When a new version of the ML model is trained by the first NNF, it can be assigned a greater (more recent) version identifier.

In some of these embodiments, one or more of the following applies:

the second message, including the single tuple, is received only when the updated version of the single ML model is more recent than the version indicated by the first message; and each of the plurality of tuples is received, in the second message, only when the updated version of the corresponding ML model is more recent than the version indicated by the first message.

In some embodiments, the first NNF is an MTLF of an NWDAF and the second NNF is an AnLF of the NWDAF. In some of these embodiments, the first message is an Nnwdaf_MLModelInfo_Request message (e.g., FIG. 11) and the second message is a response to the Nnwdaf_MLModelInfo_Request message (e.g., FIG. 12). FIG. 4 shows an example signaling diagram for these messages.

In other of these embodiments, the first message is an Nnwdaf_MLModel-Provision_Subscribe message (e.g., FIG. 9) and the second message is an Nnwdaf_MLModel-Provision_Notify message (e.g., FIG. 10). FIG. 3 shows an example signaling diagram for these messages. In some of these embodiments, the first message also includes one or more conditions for receiving the second message, including one or more of the following:

performance metrics (or identifiers thereof) for the one or more ML models on which the analytic is based;

respective thresholds for the performance metrics;

logical relations between the performance metrics and the thresholds; and

ML/AI framework constraints for execution of the one or more ML models.

In some variants, one or more of the following applies:

the second message, including the single tuple, is received only when the single ML model meets the one or more conditions included in the first message; and each of the plurality of tuples is received, in the second message, only when the corresponding ML model meets the one or more conditions included in the first message.

In some further variants, or each tuple included in the second message, the one or more information elements also include an identifier of a performance metric indicated in the first message and a value of the identified performance metric for the corresponding ML model.

In some embodiments, the exemplary method can also include the operations of block 1410, where the second NNF can use the analytic identifier to determine one or more ML model identifiers corresponding to the one or more ML models on which the analytic is based. In such case, the first message includes the determined one or more ML model identifiers.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 15:
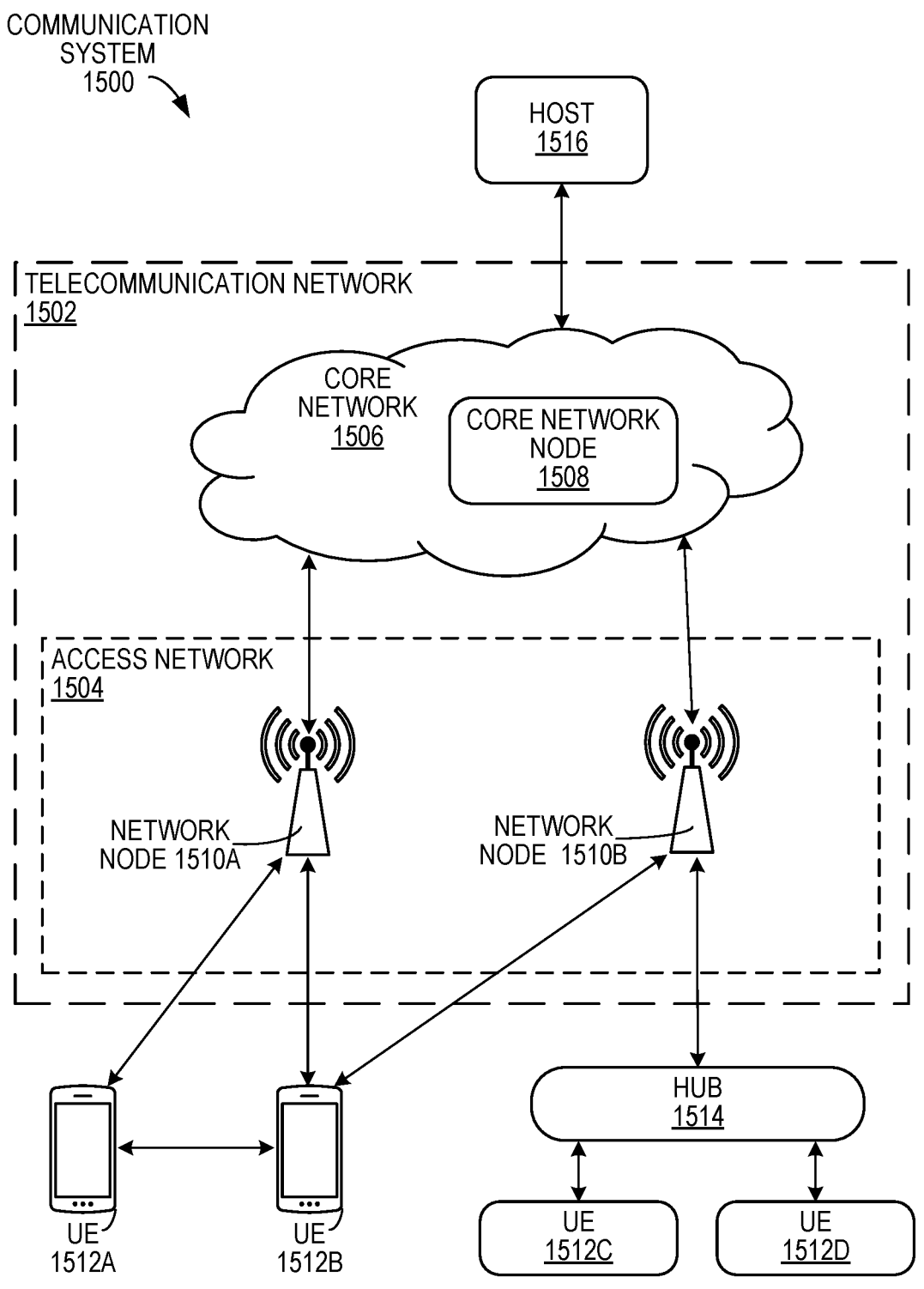
FIG. 15 shows a communication system according to various embodiments of the present disclosure.

FIG. 15 shows an example of a communication system 1500 in accordance with some embodiments. In this example, the communication system 1500 includes a telecommunication network 1502 that includes an access network 1504, such as a radio access network (RAN), and a core network 1506, which includes one or more core network nodes 1508. The access network 1504 includes one or more access network nodes, such as network nodes 1510a and 1510b (one or more of which may be generally referred to as network nodes 1510), or any other similar 3$^{rd}$ Generation Partnership Project (3GPP) access node or non-3GPP access point. The network nodes 1510 facilitate direct or indirect connection of user equipment (UE), such as by connecting UEs 1512a, 1512b, 1512c, and 1512d (one or more of which may be generally referred to as UEs 1512) to the core network 1506 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1500 may include any number of wired or wireless networks, network nodes, UEs, and/or any other components or systems that may facilitate or participate in the communication of data and/or signals whether via wired or wireless connections. The communication system 1500 may include and/or interface with any type of communication, telecommunication, data, cellular, radio network, and/or other similar type of system.

The UEs 1512 may be any of a wide variety of communication devices, including wireless devices arranged, configured, and/or operable to communicate wirelessly with the network nodes 1510 and other communication devices. Similarly, the network nodes 1510 are arranged, capable, configured, and/or operable to communicate directly or indirectly with the UEs 1512 and/or with other network nodes or equipment in the telecommunication network 1502 to enable and/or provide network access, such as wireless network access, and/or to perform other functions, such as administration in the telecommunication network 1502.

In the depicted example, the core network 1506 connects the network nodes 1510 to one or more hosts, such as host 1516. These connections may be direct or indirect via one or more intermediary networks or devices. In other examples, network nodes may be directly coupled to hosts. The core network 1506 includes one or more core network nodes (e.g., core network node 1508) that are structured with hardware and software components. Features of these components may be substantially similar to those described with respect to the UEs, network nodes, and/or hosts, such that the descriptions thereof are generally applicable to the corresponding components of the core network node 1508. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

As a specific example, one or more core network nodes 1508 can be configured to perform operations attributed to a first NNF and a second NNF in the descriptions herein of various methods or procedures. As a more specific example, the one or more core network nodes 1508 can be configured to perform operations attributed to an MTLF of an NWDAF and an AnLF of the NWDAF.

The host 1516 may be under the ownership or control of a service provider other than an operator or provider of the access network 1504 and/or the telecommunication network 1502 and may be operated by the service provider or on behalf of the service provider. The host 1516 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1500 of FIG. 15 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1502 implements 3GPP standardized features. Accordingly, the telecommunications network 1502 may support network slicing to provide different logical networks to different devices that are connected to the telecommunication network 1502. For example, the telecommunications network 1502 may provide Ultra Reliable Low Latency Communication (URLLC) services to some UEs, while providing Enhanced Mobile Broadband (eMBB) services to other UEs, and/or Massive Machine Type Communication (mMTC)/ Massive IoT services to yet further UEs.

In some examples, the UEs 1512 are configured to transmit and/or receive information without direct human interaction. For instance, a UE may be designed to transmit information to the access network 1504 on a predetermined schedule, when triggered by an internal or external event, or in response to requests from the access network 1504.

Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub 1514 communicates with the access network 1504 to facilitate indirect communication between one or more UEs (e.g., UE 1512c and/or 1512d) and network nodes (e.g., network node 1510b). In some examples, the hub 1514 may be a controller, router, content source and analytics, or any of the other communication devices described herein regarding UEs. For example, the hub 1514 may be a broadband router enabling access to the core network 1506 for the UEs. As another example, the hub 1514 may be a controller that sends commands or instructions to one or more actuators in the UEs. Commands or instructions may be received from the UEs, network nodes 1510, or by executable code, script, process, or other instructions in the hub 1514. As another example, the hub 1514 may be a data collector that acts as temporary storage for UE data and, in some embodiments, may perform analysis or other processing of the data. As another example, the hub 1514 may be a content source. For example, for a UE that is a VR headset, display, loudspeaker or other media delivery device, the hub 1514 may retrieve VR assets, video, audio, or other media or data related to sensory information via a network node, which the hub 1514 then provides to the UE either directly, after performing local processing, and/or after adding additional local content. In still another example, the hub 1514 acts as a proxy server or orchestrator for the UEs, in particular in if one or more of the UEs are low energy IoT devices.

The hub 1514 may have a constant/persistent or intermittent connection to the network node 1510b. The hub 1514 may also allow for a different communication scheme and/or schedule between the hub 1514 and UEs (e.g., UE 1512c and/or 1512d), and between the hub 1514 and the core network 1506. In other examples, the hub 1514 is connected to the core network 1506 and/or one or more UEs via a wired connection. Moreover, the hub 1514 may be configured to connect to an M2M service provider over the access network 1504 and/or to another UE over a direct connection. In some scenarios, UEs may establish a wireless connection with the network nodes 1510 while still connected via the hub 1514 via a wired or wireless connection. In some embodiments, the hub 1514 may be a dedicated hub—that is, a hub whose primary function is to route communications to/from the UEs from/to the network node 1510b. In other embodiments, the hub 1514 may be a non-dedicated hub—that is, a device which is capable of operating to route communications between the UEs and network node 1510b, but which is additionally capable of operating as a communication start and/or end point for certain data channels.

Figure 16:
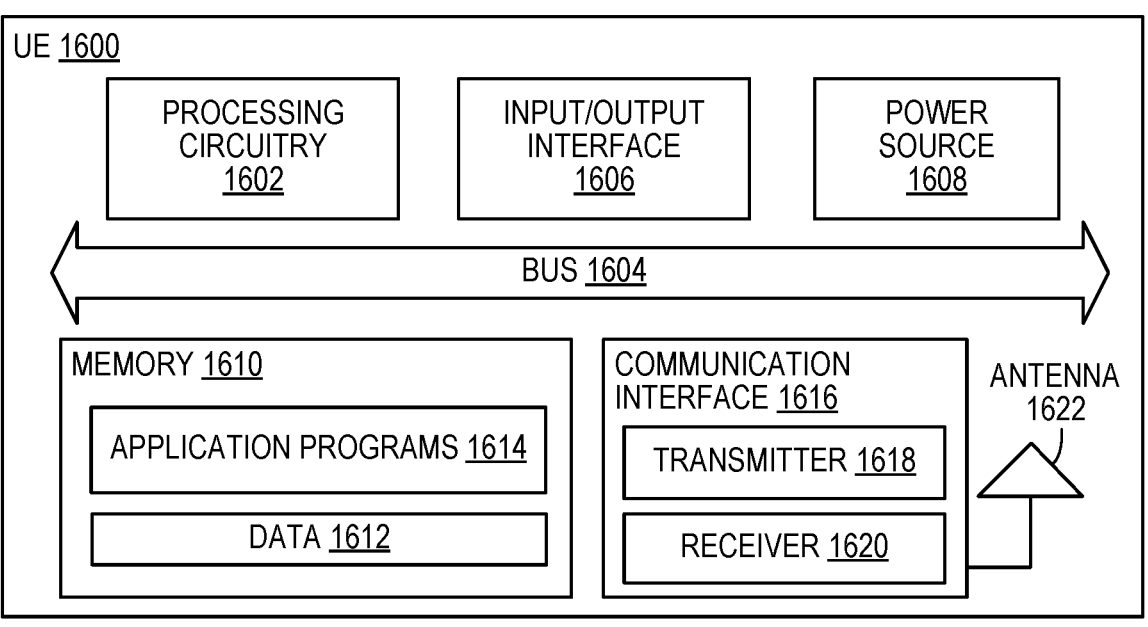
FIG. 16 shows a UE according to various embodiments of the present disclosure.

FIG. 16 shows a UE 1600 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1600 includes processing circuitry 1602 that is operatively coupled via a bus 1604 to an input/output interface 1606, a power source 1608, a memory 1610, a communication interface 1612, and/or any other component, or any combination thereof. Certain UEs may utilize all or a subset of the components shown in FIG. 16. The level of integration between the components may vary from one UE to another UE. Further, certain UEs may contain multiple instances of a component, such as multiple processors, memories, transceivers, transmitters, receivers, etc.

The processing circuitry 1602 is configured to process instructions and data and may be configured to implement any sequential state machine operative to execute instructions stored as machine-readable computer programs in the memory 1610. The processing circuitry 1602 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1602 may include multiple central processing units (CPUs).

In the example, the input/output interface 1606 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1600. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1608 is structured as a battery or battery pack. Other types of power sources, such as an external power source (e.g., an electricity outlet), photovoltaic device, or power cell, may be used. The power source 1608 may further include power circuitry for delivering power from the power source 1608 itself, and/or an external power source, to the various parts of the UE 1600 via input circuitry or an interface such as an electrical power cable. Delivering power may be, for example, for charging of the power source 1608. Power circuitry may perform any formatting, converting, or other modification to the power from the power source 1608 to make the power suitable for the respective components of the UE 1600 to which power is supplied.

The memory 1610 may be or be configured to include memory such as random-access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1610 includes one or more application programs 1614, such as an operating system, web browser application, a widget, gadget engine, or other application, and corresponding data 1616. The memory 1610 may store, for use by the UE 1600, any of a variety of various operating systems or combinations of operating systems.

The memory 1610 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1610 may allow the UE 1600 to access instructions, application programs and the like, stored on transitory or non-transitory memory media, to off-load data, or to upload data. An article of manufacture, such as one utilizing a communication system may be tangibly embodied as or in the memory 1610, which may be or comprise a device-readable storage medium.

The processing circuitry 1602 may be configured to communicate with an access network or other network using the communication interface 1612. The communication interface 1612 may comprise one or more communication subsystems and may include or be communicatively coupled to an antenna 1622. The communication interface 1612 may include one or more transceivers used to communicate, such as by communicating with one or more remote transceivers of another device capable of wireless communication (e.g., another UE or a network node in an access network). Each transceiver may include a transmitter 1618 and/or a receiver 1620 appropriate to provide network communications (e.g., optical, electrical, frequency allocations, and so forth). Moreover, the transmitter 1618 and receiver 1620 may be coupled to one or more antennas (e.g., antenna 1622) and may share circuit components, software or firmware, or alternatively be implemented separately.

In the illustrated embodiment, communication functions of the communication interface 1612 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1612, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1600 shown in FIG. 16.

As yet another specific example, in an IoT scenario, a UE may represent a machine or other device that performs monitoring and/or measurements and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 17:
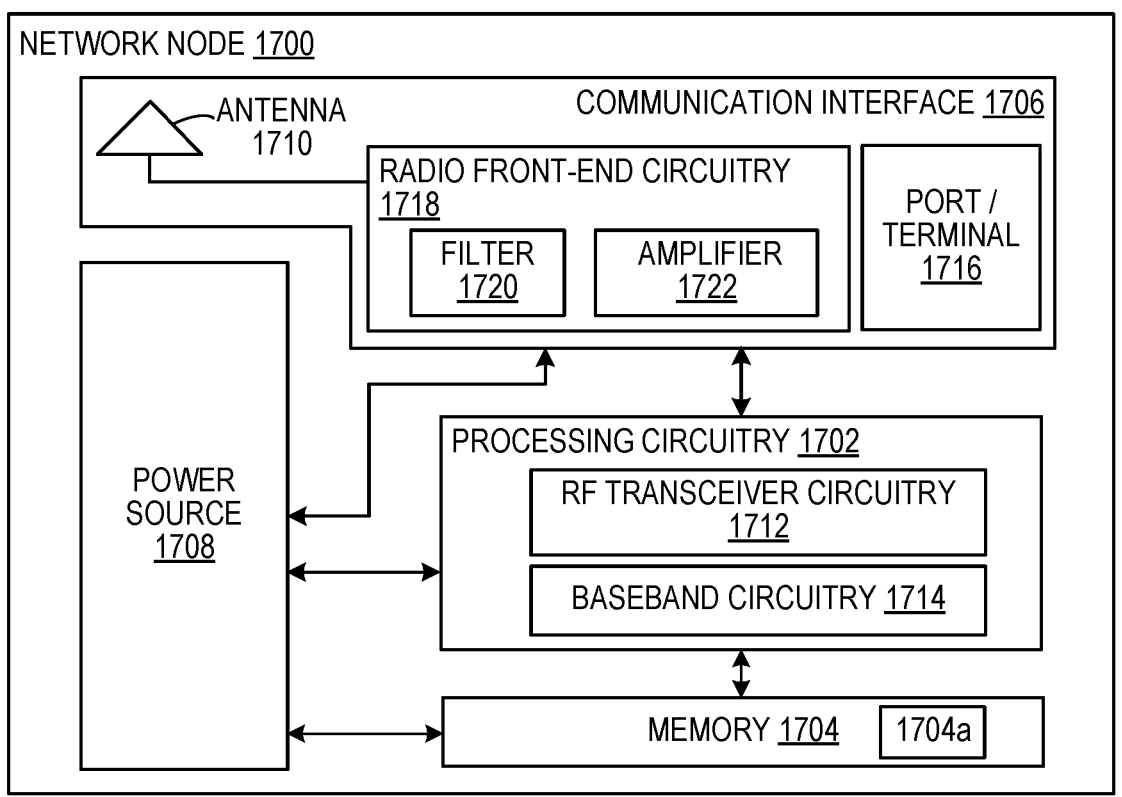
FIG. 17 shows a network node according to various embodiments of the present disclosure.

FIG. 17 shows a network node 1700 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1700 includes a processing circuitry 1702, a memory 1704, a communication interface 1706, and a power source 1708. The network node 1700 may be composed of multiple physically separate components (e.g., a NodeB component and a RNC component, or a BTS component and a BSC component, etc.), which may each have their own respective components. In certain scenarios in which the network node 1700 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1700 may be configured to support multiple radio access technologies (RATs). In such embodiments, some components may be duplicated (e.g., separate memory 1704 for different RATs) and some components may be reused (e.g., a same antenna 1710 may be shared by different RATs). The network node 1700 may also include multiple sets of the various illustrated components for different wireless technologies integrated into network node 1700, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1700.

The processing circuitry 1702 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1700 components, such as the memory 1704, to provide network node 1700 functionality.

In some embodiments, the processing circuitry 1702 includes a system on a chip (SOC). In some embodiments, the processing circuitry 1702 includes one or more of radio frequency (RF) transceiver circuitry 1712 and baseband processing circuitry 1714. In some embodiments, the radio frequency (RF) transceiver circuitry 1712 and the baseband processing circuitry 1714 may be on separate chips (or sets of chips), boards, or units, such as radio units and digital units. In alternative embodiments, part or all of RF transceiver circuitry 1712 and baseband processing circuitry 1714 may be on the same chip or set of chips, boards, or units.

The memory 1704 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1702. The memory 1704 may store any suitable instructions, data, or information, including a computer program, software, an application including one or more of logic, rules, code, tables, and/or other instructions (collectively denoted computer program product 1704*a*) capable of being executed by the processing circuitry 1702 and utilized by the network node 1700. The memory 1704 may be used to store any calculations made by the processing circuitry 1702 and/or any data received via the communication interface 1706. In some embodiments, the processing circuitry 1702 and memory 1704 is integrated.

The communication interface 1706 is used in wired or wireless communication of signaling and/or data between a network node, access network, and/or UE. As illustrated, the communication interface 1706 comprises port(s)/terminal(s) 1716 to send and receive data, for example to and from a network over a wired connection. The communication interface 1706 also includes radio front-end circuitry 1718 that may be coupled to, or in certain embodiments a part of, the antenna 1710. Radio front-end circuitry 1718 comprises filters 1720 and amplifiers 1722. The radio front-end circuitry 1718 may be connected to an antenna 1710 and processing circuitry 1702. The radio front-end circuitry may be configured to condition signals communicated between antenna 1710 and processing circuitry 1702. The radio front-end circuitry 1718 may receive digital data that is to be sent out to other network nodes or UEs via a wireless connection. The radio front-end circuitry 1718 may convert the digital data into a radio signal having the appropriate channel and bandwidth parameters using a combination of filters 1720 and/or amplifiers 1722. The radio signal may then be transmitted via the antenna 1710. Similarly, when receiving data, the antenna 1710 may collect radio signals which are then converted into digital data by the radio front-end circuitry 1718. The digital data may be passed to the processing circuitry 1702. In other embodiments, the communication interface may comprise different components and/or different combinations of components.

In certain alternative embodiments, the network node 1700 does not include separate radio front-end circuitry 1718, instead, the processing circuitry 1702 includes radio front-end circuitry and is connected to the antenna 1710. Similarly, in some embodiments, all or some of the RF transceiver circuitry 1712 is part of the communication interface 1706. In still other embodiments, the communication interface 1706 includes one or more ports or terminals 1716, the radio front-end circuitry 1718, and the RF transceiver circuitry 1712, as part of a radio unit (not shown), and the communication interface 1706 communicates with the baseband processing circuitry 1714, which is part of a digital unit (not shown).

The antenna 1710 may include one or more antennas, or antenna arrays, configured to send and/or receive wireless signals. The antenna 1710 may be coupled to the radio front-end circuitry 1718 and may be any type of antenna capable of transmitting and receiving data and/or signals wirelessly. In certain embodiments, the antenna 1710 is separate from the network node 1700 and connectable to the network node 1700 through an interface or port.

The antenna 1710, communication interface 1706, and/or the processing circuitry 1702 may be configured to perform any receiving operations and/or certain obtaining operations described herein as being performed by the network node. Any information, data and/or signals may be received from a UE, another network node and/or any other network equipment. Similarly, the antenna 1710, the communication interface 1706, and/or the processing circuitry 1702 may be configured to perform any transmitting operations described herein as being performed by the network node. Any information, data and/or signals may be transmitted to a UE, another network node and/or any other network equipment.

The power source 1708 provides power to the various components of network node 1700 in a form suitable for the respective components (e.g., at a voltage and current level needed for each respective component). The power source 1708 may further comprise, or be coupled to, power management circuitry to supply the components of the network node 1700 with power for performing the functionality described herein. For example, the network node 1700 may be connectable to an external power source (e.g., the power grid, an electricity outlet) via an input circuitry or interface such as an electrical cable, whereby the external power source supplies power to power circuitry of the power source 1708. As a further example, the power source 1708 may comprise a source of power in the form of a battery or battery pack which is connected to, or integrated in, power circuitry. The battery may provide backup power should the external power source fail.

Embodiments of the network node 1700 may include additional components beyond those shown in FIG. 17 for providing certain aspects of the network node's functionality, including any of the functionality described herein and/or any functionality necessary to support the subject matter described herein. For example, the network node 1700 may include user interface equipment to allow input of information into the network node 1700 and to allow output of information from the network node 1700. This may allow a user to perform diagnostic, maintenance, repair, and other administrative functions for the network node 1700.

As a specific example, one or more network nodes 1700 can be configured to perform operations attributed to a first NNF and a second NNF in the descriptions herein of various methods or procedures. As a more specific example, the one or more network nodes 1700 can be configured to perform operations attributed to an MTLF of an NWDAF and an AnLF of the NWDAF.

Figure 18:
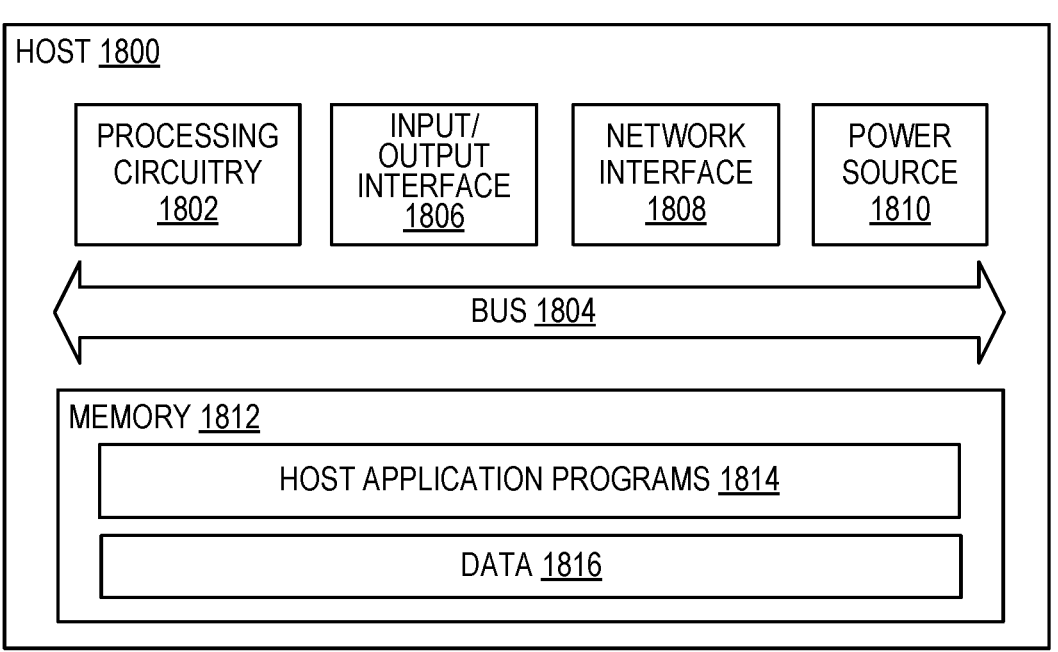
FIG. 18 shows host computing system according to various embodiments of the present disclosure.

FIG. 18 is a block diagram of a host 1800, which may be an embodiment of the host 1516 of FIG. 15, in accordance with various aspects described herein. As used herein, the host 1800 may be or comprise various combinations hardware and/or software, including a standalone server, a blade server, a cloud-implemented server, a distributed server, a virtual machine, container, or processing resources in a server farm. The host 1800 may provide one or more services to one or more UEs.

The host 1800 includes processing circuitry 1802 that is operatively coupled via a bus 1804 to an input/output interface 1806, a network interface 1808, a power source 1810, and a memory 1812. Other components may be included in other embodiments. Features of these components may be substantially similar to those described with respect to the devices of previous figures, such as FIGS. 16 and 17, such that the descriptions thereof are generally applicable to the corresponding components of host 1800.

The memory 1812 may include one or more computer programs including one or more host application programs 1814 and data 1816, which may include user data, e.g., data generated by a UE for the host 1800 or data generated by the host 1800 for a UE. Embodiments of the host 1800 may utilize only a subset or all of the components shown. The host application programs 1814 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1814 may also provide for user authentication and licensing checks and may periodically report health, routes, and content availability to a central node, such as a device in or on the edge of a core network. Accordingly, the host 1800 may select and/or indicate a different host for over-the-top services for a UE. The host application programs 1814 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 19:
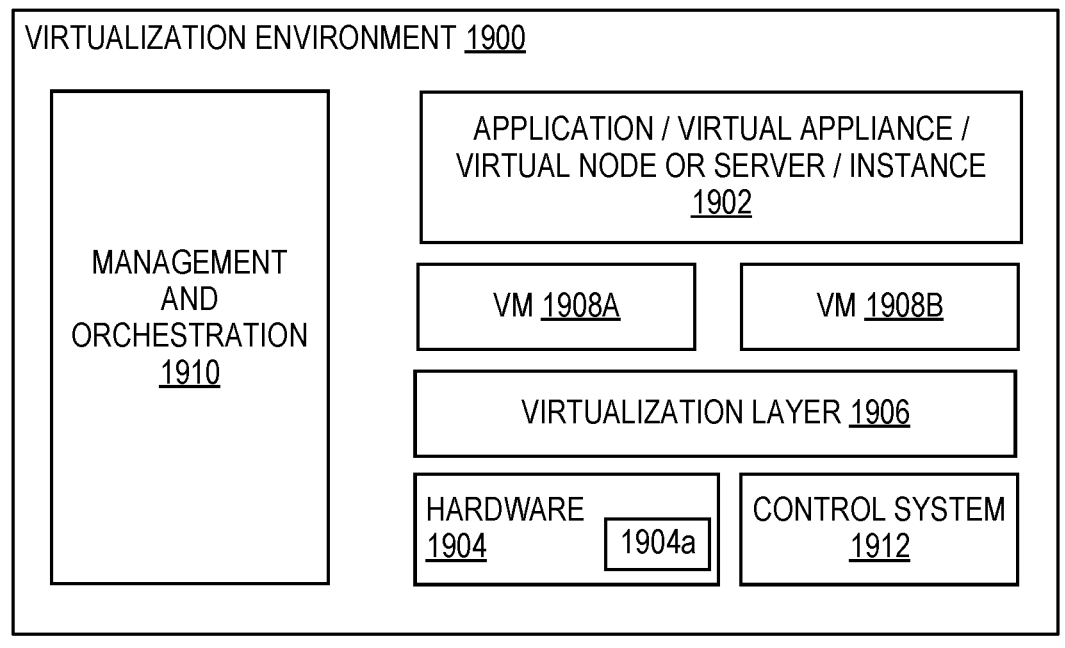
FIG. 19 is a block diagram of a virtualization environment in which functions implemented by some embodiments of the present disclosure may be virtualized.

FIG. 19 is a block diagram illustrating a virtualization environment 1900 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1900 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1902 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

As a specific example, a first NNF and/or a second NNF, described herein in relation to other figures, can be implemented as virtual network functions 1902 in virtualization environment 1900. As a more specific example, an MTLF of an NWDAF and/or an AnLF of the NWDAF can be implemented as virtual network functions 1902 in virtualization environment 1900.

Hardware 1904 includes processing circuitry, memory that stores software and/or instructions (collectively denoted computer program product 1904*a*) executable by hardware processing circuitry, and/or other hardware devices as described herein, such as a network interface, input/output interface, and so forth. Software may be executed by the processing circuitry to instantiate one or more virtualization layers 1906 (also referred to as hypervisors or virtual machine monitors (VMMs)), provide VMs 1908*a* and 1908*b* (one or more of which may be generally referred to as VMs 1908), and/or perform any of the functions, features and/or benefits described in relation with some embodiments described herein. The virtualization layer 1906 may present a virtual operating platform that appears like networking hardware to the VMs 1908.

The VMs 1908 comprise virtual processing, virtual memory, virtual networking or interface and virtual storage, and may be run by a corresponding virtualization layer 1906. Different embodiments of the instance of a virtual appliance 1902 may be implemented on one or more of VMs 1908, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1908 may be a software implementation of a physical machine that runs programs as if they were executing on a physical, non-virtualized machine. Each of the VMs 1908, and that part of hardware 1904 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1908 on top of the hardware 1904 and corresponds to the application 1902.

Hardware 1904 may be implemented in a standalone network node with generic or specific components. Hardware 1904 may implement some functions via virtualization. Alternatively, hardware 1904 may be part of a larger cluster of hardware (e.g., such as in a data center or CPE) where many hardware nodes work together and are managed via management and orchestration 1910, which, among others, oversees lifecycle management of applications 1902. In some embodiments, hardware 1904 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1912 which may alternatively be used for communication between hardware nodes and radio units.

Figure 20:
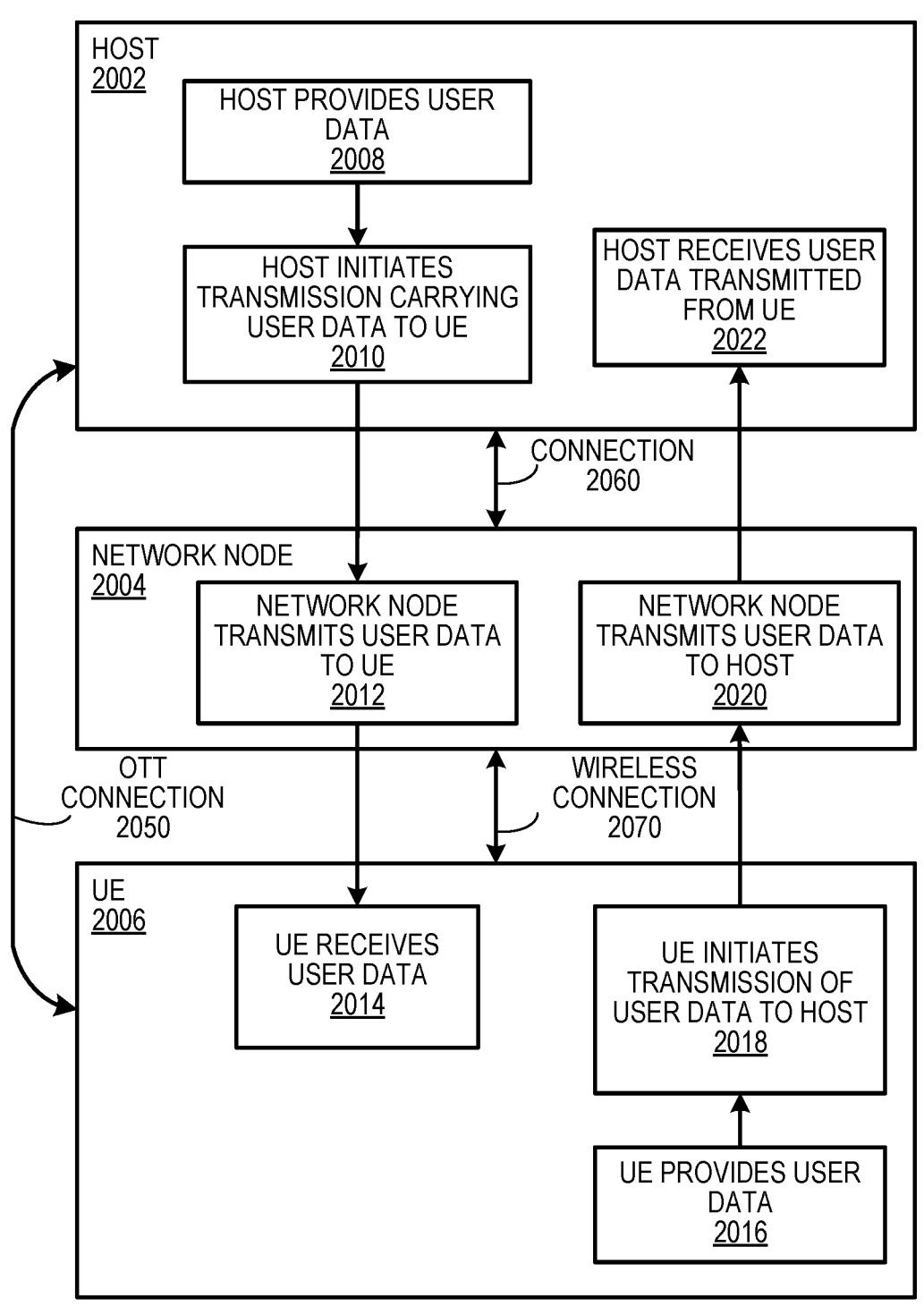
FIG. 20 illustrates communication between a host computing system, a network node, and a UE via multiple connections, according to various embodiments of the present disclosure.

FIG. 20 shows a communication diagram of a host 2002 communicating via a network node 2004 with a UE 2006 over a partially wireless connection in accordance with some embodiments. Example implementations, in accordance with various embodiments, of the UE (such as a UE 1512a of FIG. 15 and/or UE 1600 of FIG. 16), network node (such as network node 1510a of FIG. 15 and/or network node 1700 of FIG. 17), and host (such as host 1516 of FIG. 15 and/or host 1800 of FIG. 18) discussed in the preceding paragraphs will now be described with reference to FIG. 20.

Like host 1800, embodiments of host 2002 include hardware, such as a communication interface, processing circuitry, and memory. The host 2002 also includes software, which is stored in or accessible by the host 2002 and executable by the processing circuitry. The software includes a host application that may be operable to provide a service to a remote user, such as the UE 2006 connecting via an over-the-top (OTT) connection 2050 extending between the UE 2006 and host 2002. In providing the service to the remote user, a host application may provide user data which is transmitted using the OTT connection 2050.

The network node 2004 includes hardware enabling it to communicate with the host 2002 and UE 2006. The connection 2060 may be direct or pass through a core network (like core network 1506 of FIG. 15) and/or one or more other intermediate networks, such as one or more public, private, or hosted networks. For example, an intermediate network may be a backbone network or the Internet.

The UE 2006 includes hardware and software, which is stored in or accessible by UE 2006 and executable by the UE's processing circuitry. The software includes a client application, such as a web browser or operator-specific "app" that may be operable to provide a service to a human or non-human user via UE 2006 with the support of the host 2002. In the host 2002, an executing host application may communicate with the executing client application via the OTT connection 2050 terminating at the UE 2006 and host 2002. In providing the service to the user, the UE's client application may receive request data from the host's host application and provide user data in response to the request data. The OTT connection 2050 may transfer both the request data and the user data. The UE's client application may interact with the user to generate the user data that it provides to the host application through the OTT connection 2050.

The OTT connection 2050 may extend via a connection 2060 between the host 2002 and the network node 2004 and via a wireless connection 2070 between the network node 2004 and the UE 2006 to provide the connection between the host 2002 and the UE 2006. The connection 2060 and wireless connection 2070, over which the OTT connection 2050 may be provided, have been drawn abstractly to illustrate the communication between the host 2002 and the UE 2006 via the network node 2004, without explicit reference to any intermediary devices and the precise routing of messages via these devices.

As an example of transmitting data via the OTT connection 2050, in step 2008, the host 2002 provides user data, which may be performed by executing a host application. In some embodiments, the user data is associated with a particular human user interacting with the UE 2006. In other embodiments, the user data is associated with a UE 2006 that shares data with the host 2002 without explicit human interaction. In step 2010, the host 2002 initiates a transmission carrying the user data towards the UE 2006. The host 2002 may initiate the transmission responsive to a request transmitted by the UE 2006. The request may be caused by human interaction with the UE 2006 or by operation of the client application executing on the UE 2006. The transmission may pass via the network node 2004, in accordance with the teachings of the embodiments described throughout this disclosure. Accordingly, in step 2012, the network node 2004 transmits to the UE 2006 the user data that was carried in the transmission that the host 2002 initiated, in accordance with the teachings of the embodiments described throughout this disclosure. In step 2014, the UE 2006 receives the user data carried in the transmission, which may be performed by a client application executed on the UE 2006 associated with the host application executed by the host 2002.

In some examples, the UE 2006 executes a client application which provides user data to the host 2002. The user data may be provided in reaction or response to the data received from the host 2002. Accordingly, in step 2016, the UE 2006 may provide user data, which may be performed by executing the client application. In providing the user data, the client application may further consider user input received from the user via an input/output interface of the UE 2006. Regardless of the specific manner in which the user data was provided, the UE 2006 initiates, in step 2018, transmission of the user data towards the host 2002 via the network node 2004. In step 2020, in accordance with the teachings of the embodiments described throughout this disclosure, the network node 2004 receives user data from the UE 2006 and initiates transmission of the received user data towards the host 2002. In step 2022, the host 2002 receives the user data carried in the transmission initiated by the UE 2006.

One or more of the various embodiments improve the performance of OTT services provided to the UE 2006 using the OTT connection 2050, in which the wireless connection 2070 forms the last segment. Embodiments disclosed herein can improve management of ML models used for analytics in communication networks (e.g., 5GC). More precisely, embodiments can enable an MTLF to identify the ML models it has retrained when notifying the AnLF, thereby enabling the AnLF to swap the specific ML model it is using for inference. As another example, embodiments can enable an AnLF to express the conditions upon which the MTLF should retrain a ML model. As another example, embodiments can enable an MTLF to express training performance results so that it may decide whether it will swap ML models. In this manner, embodiments can facilitate improved analytics within the network (particularly based on ML models), which can lead to improved network performance. Moreover, improved network performance can increase the value of OTT services delivered via the network to both service providers and end users In an example scenario, factory status information may be collected and analyzed by the host 2002. As another example, the host 2002 may process audio and video data which may have been retrieved from a UE for use in creating maps. As another example, the host 2002 may collect and analyze real-time data to assist in controlling vehicle congestion (e.g., controlling traffic lights). As another example, the host 2002 may store surveillance video uploaded by a UE. As another example, the host 2002 may store or control access to media content such as video, audio, VR or AR which it can broadcast, multicast or unicast to UEs. As other examples, the host 2002 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 2050 between the host 2002 and UE 2006, in response to variations in the measurement results. The measurement procedure and/or the network functionality for reconfiguring the OTT connection may be implemented in software and hardware of the host 2002 and/or UE 2006. In some embodiments, sensors (not shown) may be deployed in or in association with other devices through which the OTT connection 2050 passes; the sensors may participate in the measurement procedure by supplying values of the monitored quantities exemplified above or by supplying values of other physical quantities from which software may compute or estimate the monitored quantities. The reconfiguring of the OTT connection 2050 may include message format, retransmission settings, preferred routing etc.; the reconfiguring need not directly alter the operation of the network node 2004. Such procedures and functionalities may be known and practiced in the art. In certain embodiments, measurements may involve proprietary UE signaling that facilitates measurements of throughput, propagation times, latency and the like, by the host 2002. The measurements may be implemented in that software causes messages to be transmitted, in particular empty or 'dummy' messages, using the OTT connection 2050 while monitoring propagation times, errors, etc.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

Example embodiments of the techniques and apparatus described herein include, but are not limited to, the following enumerated embodiments:

A1. A method for a first node of a communication network, the method comprising:

receiving, from a second node of the communications network, a first message including one of the following:
  one or more ML model identifiers corresponding to one or more ML models maintained by the first node, or
  an identifier of an analytic based on the one or more ML models; and sending, to the second node, a second message including one of the following:
  a plurality of tuples corresponding to a plurality of ML models on which the analytic is based, wherein each tuple includes a different one of the ML model identifiers and a network address associated with the corresponding ML model; or a single tuple including the analytic identifier and a network address associated with a single ML model on which the analytic is based.

A2. The method of embodiment A1, wherein each network address included in the second message is one of the following: a universal resource locator (URL), or a fully qualified domain name (FQDN).

A3. The method of any of embodiments A1-A2, wherein each network address included in the second message is one of the following:

an address from which the corresponding ML model can be obtained; or an address from which a manifest or a metadata file associated with the corresponding ML model can be obtained.

A4. The method of any of embodiments A3, wherein the manifest or the metadata file associated with each of the ML models includes the following:

ML model identifier;

identifier of one or more analytics that are based on the ML model;

updated version of the ML model;

creation timestamp of the updated version of the ML model; and network address from which the ML model can be obtained.

A5. The method of any of embodiments A1-A4, wherein each tuple in the second message also includes an updated version of the corresponding ML model.

A6. The method of any of embodiments A1-A5, further comprising, when the first message includes the analytic identifier, using the analytic identifier to determine one or more ML model identifiers corresponding to the one or more ML models on which the analytic is based.

A7. The method of any of embodiments A1-A5, wherein when the first message includes the one or more of ML model identifiers, the first message also indicates versions associated with corresponding ML models.

A8. The method of embodiment A7, wherein sending the second message comprises one of the following:

selectively sending the second message including the single tuple, based on the updated version of the single ML model being more recent than the version indicated by the first message; or selectively including each of the plurality of tuples in the second message, based on the updated version of the corresponding ML model being more recent than the version indicated by the first message.

A8a. The method of any of embodiments A1-A8, wherein the first node is a model training logical function (MTLF) of a network data analytics function (NWDAF), and the second node is an analytics logical function (AnLF) of the NWDAF.

A9. The method of embodiment A8a, wherein the first message is an Nnwdaf_MLModelInfo_Request message and the second message is a response to the Nnwdaf_MLModelInfo_Request message.

A10. The method of embodiment A8a, wherein the first message is an Nnwdaf_MLModelProvision_Subscribe message and the second message is an Nnwdaf_MLModelProvision_Notify message.

A11. The method of embodiment A10, wherein the first message also includes one or more conditions for receiving the second message, including one or more of the following:

performance metrics for the one or more ML models on which the analytic is based;

respective thresholds for the performance metrics;

logical relations between the performance metrics and the thresholds; and

ML/AI framework constraints for execution of the one or more ML models.

A12. The method of embodiment A11, wherein sending the second message comprises one of the following:

selectively sending the second message including the single tuple, based on the single ML model meeting the one or more conditions included in the first message; or selectively including each of the plurality of tuples in the second message, based on the corresponding ML model meeting the one or more conditions included in the first message.

A13. The method of embodiment A12, wherein each tuple included in the second message also includes the following:

an identifier of a performance metric indicated in the first message; and a value of the identified performance metric for the corresponding ML model.

A14. The method of any of embodiments A11-A13, further comprising determining whether to retrain the one or more ML models based on whether current values of the performance metrics for the respective models satisfy the respective thresholds and logical relations.

B1. A method for a second node of a communication network, the method comprising:

sending, to a first node of the communications network, a first message including one of the following:

one or more ML model identifiers corresponding to one or more ML models maintained by the first node, or an identifier of an analytic based on the one or more ML models; and receiving, from the first node, a second message including one of the following:

a plurality of tuples corresponding to a plurality of ML models on which the analytic is based, wherein each tuple includes a different one of the ML model identifiers and a network address associated with the corresponding ML model; or a single tuple including the analytic identifier and a network address associated with a single ML model on which the analytic is based.

B2. The method of embodiment B1, wherein each network address included in the second message is one of the following: a universal resource locator (URL), or a fully qualified domain name (FQDN).

B3. The method of any of embodiments B1-B2, wherein each network address included in the second message is one of the following:

an address from which the corresponding ML model can be obtained; or an address from which a manifest or a metadata file associated with the corresponding ML model can be obtained.

B4. The method of any of embodiments B3, wherein the manifest or the metadata file associated with each of the ML models includes the following:

ML model identifier;

identifier of one or more analytics that are based on the ML model;

updated version of the ML model;

creation timestamp of the updated version of the ML model; and network address from which the ML model can be obtained.

B5. The method of any of embodiments B1-B4, wherein each tuple in the second message also includes an updated version of the corresponding ML model.

B6. The method of any of embodiments B1-B5, wherein when the first message includes the one or more of ML model identifiers, the first message also indicates versions associated with corresponding ML models.

B7. The method of embodiment B6, wherein one or more of the following applies:
the second message, including the single tuple, is received only when the updated version of the single ML model is more recent than the version indicated by the first message; and
each of the plurality of tuples is received, in the second message, only when the updated version of the corresponding ML model is more recent than the version indicated by the first message.

B7a. The method of any of embodiments B1-B7, wherein the first node is a model training logical function (MTLF) of a network data analytics function (NWDAF), and the second node is an analytics logical function (AnLF) of the NWDAF.

B8. The method of embodiment B7a, wherein the first message is an Nnwdaf_MLModelInfo_Request message and the second message is a response to the Nnwdaf_MLModelInfo_Request message.

B9. The method of embodiment B7a, wherein the first message is an Nnwdaf_MLModelProvision_Subscribe message and the second message is an Nnwdaf_MLModelProvision_Notify message.

B10. The method of embodiment B9, wherein the first message also includes one or more conditions for receiving the second message, including one or more of the following:
performance metrics for the one or more ML models on which the analytic is based;
respective thresholds for the performance metrics;
logical relations between the performance metrics and the thresholds; and
ML/AI framework constraints for execution of the one or more ML models.

B11. The method of embodiment B10, wherein one or more of the following applies:
the second message, including the single tuple, is received only when the single ML model meets the one or more conditions included in the first message; and
each of the plurality of tuples is received, in the second message, only when the corresponding ML model meets the one or more conditions included in the first message.

B12. The method of embodiment B11, wherein each tuple included in the second message also includes the following:
an identifier of a performance metric indicated in the first message; and
a value of the identified performance metric for the corresponding ML model.

B13. The method of any of embodiments B1-B12, further comprising:
obtaining the single ML model or the plurality of ML models based on the network addresses in the corresponding single tuple or plurality of tuples; and
applying the obtained single ML model or plurality of ML models to determine the analytic identified by the analytic identifier.

B14. The method of any of embodiments B1-B13, further comprising using the analytic identifier to determine one or more ML model identifiers corresponding to the one or more ML models on which the analytic is based, wherein the first message includes the determined one or more ML model identifiers.

C1. A model training logical function (MTLF) of a network data analytics function (NWDAF) of a communication network, wherein:
the MTLF is implemented by communication interface circuitry and processing circuitry that are operably coupled; and
the processing circuitry and interface circuitry are configured to perform operations corresponding to any of the methods of embodiments A1-A14.

C2. A model training logical function (MTLF) of a network data analytics function (NWDAF) of a communication network, the MTLF being configured to perform operations corresponding to any of the methods of embodiments A1-A14.

C3. A non-transitory, computer-readable medium storing computer-executable instructions that, when executed by processing circuitry associated with a model training logical function (MTLF) of a network data analytics function (NWDAF) of a communication network, configure the MTLF to perform operations corresponding to any of the methods of embodiments A1-A14.

C4. A computer program product comprising computer-executable instructions that, when executed by processing circuitry associated with a model training logical function (MTLF) of a network data analytics function (NWDAF) of a communication network, configure the MTLF to perform operations corresponding to any of the methods of embodiments A1-A14.

D1. An analytics logical function (AnLF) of a network data analytics function (NWDAF) of a communication network, wherein:
the AnLF is implemented by communication interface circuitry and processing circuitry that are operably coupled; and
the processing circuitry and interface circuitry are configured to perform operations corresponding to any of the methods of embodiments B1-B12.

D2. An analytics logical function (AnLF) of a network data analytics function (NWDAF) of a communication network, the AnLF being configured to perform operations corresponding to any of the methods of embodiments B1-B12.

D3. A non-transitory, computer-readable medium storing computer-executable instructions that, when executed by processing circuitry associated with an analytics logical function (AnLF) of a network data analytics function (NWDAF) of a communication network, configure the AnLF to perform operations corresponding to any of the methods of embodiments B1-B12.

D4. A computer program product comprising computer-executable instructions that, when executed by processing circuitry associated with an analytics logical function (AnLF) of a network data analytics function (NWDAF) of a communication network, configure the AnLF to perform operations corresponding to any of the methods of embodiments B1-B12.

The invention claimed is:
1. A method for a first network node or function (NNF) configured for machine learning (ML) model management in a communication network, the method comprising:
receiving, from a second NNF of the communication network, a first message including one but not both of the following:
one or more ML model identifiers corresponding to one or more ML models maintained by the first NNF, and an identifier of an analytic based on the one or more ML models; and sending, to the second NNF in response to the first message, a second message including one of the following:

a plurality of tuples corresponding to a plurality of ML models on which the analytic is based, wherein each tuple includes a different one of the ML model identifiers and one or more information elements associated with the corresponding ML model; or a single tuple including the analytic identifier and one or more information elements associated with a single ML model on which the analytic is based.

2. The method of claim 1, wherein:

for each tuple included in the second message, the one or more information elements include a network address, which is one of the following: a universal resource locator (URL); or a fully qualified domain name (FQDN); and each network address included in the second message is one of the following:

an address from which the corresponding ML model can be obtained; or an address from which a manifest or a metadata file associated with the corresponding ML model can be obtained.

3. The method of claim 2, wherein the manifest or the metadata file associated with each of the ML models includes the following:

ML model identifier;

identifier of one or more analytics that are based on the ML model;

updated version of the ML model;

creation timestamp of the updated version of the ML model; and network address from which the ML model can be obtained.

4. The method of claim 1, wherein for each tuple included in the second message, the one or more information elements include at least one of the following:

an updated version of the corresponding ML model; and an identifier of a performance metric indicated in the first message and a value of the identified performance metric for the corresponding ML model.

5. The method of claim 1, further comprising, when the first message includes the analytic identifier, using the analytic identifier to determine the one or more ML model identifiers corresponding to the one or more ML models on which the analytic is based.

6. The method of claim 1, wherein when the first message includes the one or more of ML model identifiers, the first message also indicates versions for the ML models corresponding to the ML model identifiers.

7. The method of claim 6, wherein sending the second message comprises one of the following:

selectively sending the second message including the single tuple, based on the updated version of the single ML model being more recent than the version indicated by the first message; or selectively including each of the plurality of tuples in the second message, based on the updated version of the corresponding ML model being more recent than the version indicated by the first message.

8. The method of claim 1, wherein:

the first NNF is a model training logical function (MTLF) of a network data analytics function (NWDAF); and the second NNF is an analytics logical function (AnLF) of the NWDAF.

9. The method of claim 1, wherein one of the following applies:

the first message is an Nnwdaf_MLModelInfo_Request message and the second message is a response to the Nnwdaf_MLModelInfo_Request message; or the first message is an Nnwdaf_MLModelProvision_Subscribe message and the second message is an Nnwdaf_MLModelProvision_Notify message.

10. The method of claim 1, wherein the first message also identifies one or more conditions for sending the second message, based on one or more of the following:

performance metrics for the one or more ML models on which the analytic is based;

respective thresholds for the performance metrics;

logical relations between the performance metrics and the thresholds; and

ML/AI framework constraints for execution of the one or more ML models.

11. The method of claim 10, wherein sending the second message comprises one of the following:

selectively sending the second message including the single tuple, based on the single ML model meeting the one or more conditions included in the first message; or selectively including each of the plurality of tuples in the second message, based on the corresponding ML model meeting the one or more conditions included in the first message.

12. A method for a second network node or function (NNF) configured for machine learning (ML) model management in a communication network, the method comprising:

sending, to a first NNF of the communication network, a first message including one but not both of the following:

one or more ML model identifiers corresponding to one or more ML models maintained by the first NNF, and an identifier of an analytic based on the one or more ML models; and receiving, from the first NNF in response to the first message, a second message including one of the following:

a plurality of tuples corresponding to a plurality of ML models on which the analytic is based, wherein each tuple includes a different one of the ML model identifiers and one or more information elements associated with the corresponding ML model; or a single tuple including the analytic identifier and one or more information elements associated with a single ML model on which the analytic is based.

13. The method of claim 12, wherein:

for each tuple included in the second message, the one or more information elements include a network address, which is one of the following: a universal resource locator (URL); or a fully qualified domain name (FQDN); and each network address included in the second message is one of the following:

an address from which the corresponding ML model can be obtained; or an address from which a manifest or a metadata file associated with the corresponding ML model can be obtained.

14. The method of claim 13, wherein the manifest or the metadata file associated with each of the ML models includes the following:

ML model identifier;

identifier of one or more analytics that are based on the ML model;

updated version of the ML model;

creation timestamp of the updated version of the ML model; and network address from which the ML model can be obtained.

15. The method of claim 12, further comprising:

obtaining the single ML model or the plurality of ML models based on network addresses in the corresponding single tuple or plurality of tuples; and applying the obtained single ML model or plurality of ML models to determine the analytic identified by the analytic identifier.

16. The method of claim 12, wherein for each tuple included in the second message, the one or more information elements include at least one of the following:

an updated version of the corresponding ML model; and an identifier of a performance metric indicated in the first message and a value of the identified performance metric for the corresponding ML model.

17. The method of claim 12, wherein when the first message includes the one or more of ML model identifiers, the first message also indicates versions for the ML models corresponding to the ML model identifiers.

18. The method of claim 17, wherein one or more of the following applies:

the second message, including the single tuple, is received only when the updated version of the single ML model is more recent than the version indicated by the first message; and each of the plurality of tuples is received, in the second message, only when the updated version of the corresponding ML model is more recent than the version indicated by the first message.

19. The method of claim 12, wherein:

the first NNF is a model training logical function (MTLF) of a network data analytics function (NWDAF); and the second NNF is an analytics logical function (AnLF) of the NWDAF.

20. The method of claim 12, wherein one of the following applies:

the first message is an Nnwdaf_MLModelInfo_Request message and the second message is a response to the Nnwdaf_MLModelInfo_Request message; or the first message is an Nnwdaf_MLModelProvision_Subscribe message and the second message is an Nnwdaf_MLModelProvision_Notify message.

21. The method of claim 12, wherein the first message also identifies one or more conditions for sending the second message, based on one or more of the following:

performance metrics for the one or more ML models on which the analytic is based;

respective thresholds for the performance metrics;

logical relations between the performance metrics and the thresholds; and

ML/AI framework constraints for execution of the one or more ML models.

22. The method of claim 20, wherein one or more of the following applies:

the second message, including the single tuple, is received only when the single ML model meets the one or more conditions included in the first message; and each of the plurality of tuples is included in the second message, only when the corresponding ML model meets the one or more conditions included in the first message.

23. The method of claim 12, further comprising using the analytic identifier to determine one or more ML model identifiers corresponding to the one or more ML models on which the analytic is based, wherein the first message includes the determined one or more ML model identifiers.

24. Network equipment arranged to implement a first network node or function (NNF) configured for machine learning (ML) model management in a communication network, wherein the network equipment comprises:

communication interface circuitry configured to communicate with a second NNF of the communication network; and processing circuitry operably coupled to the communication interface circuitry, wherein the processing circuitry and the communication interface circuitry are configured to:

receive, from the second NNF, a first message including one but not both of the following:

one or more ML model identifiers corresponding to one or more ML models maintained by the first NNF, and an identifier of an analytic based on the one or more ML models; and send, to the second NNF in response to the first message, a second message including one of the following:

a plurality of tuples corresponding to a plurality of ML models on which the analytic is based, wherein each tuple includes a different one of the ML model identifiers and one or more information elements associated with the corresponding ML model; or a single tuple including the analytic identifier and one or more information elements associated with a single ML model on which the analytic is based.

25. Network equipment arranged to implement a second network node or function (NNF) configured for machine learning (ML) model management in a communication network, wherein the network equipment comprises:

communication interface circuitry configured to communicate with a first NNF of the communication network; and processing circuitry operably coupled to the communication interface circuitry, wherein the processing circuitry and the communication interface circuitry are configured to:

send, to the first NNF, a first message including one but not both of the following:

one or more ML model identifiers corresponding to one or more ML models maintained by the first NNF, and an identifier of an analytic based on the one or more ML models; and receive, from the first NNF in response to the first message, a second message including one of the following:

a plurality of tuples corresponding to a plurality of ML models on which the analytic is based, wherein each tuple includes a different one of the ML model identifiers and one or more information elements associated with the corresponding ML model; or a single tuple including the analytic identifier and one or more information elements associated with a single ML model on which the analytic is based.

\* \* \* \* \*